(12) United States Patent
Nill

(10) Patent No.: US 11,828,066 B2
(45) Date of Patent: Nov. 28, 2023

(54) ANCHOR PLATFORM ASSEMBLY ESPECIALLY USEFUL FOR ROOF ACCESSORY STRUCTURES

(71) Applicant: Lance Nill, Southampton, NY (US)

(72) Inventor: Lance Nill, Southampton, NY (US)

(73) Assignee: LN1 Inc., Southampton, NY (US)

( * ) Notice: Subject to any disclaimer, the term of this patent is extended or adjusted under 35 U.S.C. 154(b) by 0 days.

(21) Appl. No.: 17/262,450

(22) PCT Filed: Jul. 24, 2019

(86) PCT No.: PCT/US2019/043264
§ 371 (c)(1),
(2) Date: Jan. 22, 2021

(87) PCT Pub. No.: WO2020/023653
PCT Pub. Date: Jan. 30, 2020

(65) Prior Publication Data
US 2021/0301535 A1 Sep. 30, 2021

Related U.S. Application Data

(63) Continuation-in-part of application No. PCT/US2019/018592, filed on Feb. 19, 2019, which
(Continued)

(51) Int. Cl.
*E04D 13/00* (2006.01)
*F16B 9/02* (2006.01)
*E04F 11/18* (2006.01)

(52) U.S. Cl.
CPC ............... *E04D 13/00* (2013.01); *F16B 9/02* (2013.01); *E04F 11/1812* (2013.01); *E04F 11/1853* (2013.01)

(58) Field of Classification Search
CPC .......... F16B 9/026; F16B 9/02; F16B 37/122; F16B 37/125; E04F 11/1853; E04F 11/1812
(Continued)

(56) References Cited

U.S. PATENT DOCUMENTS 2,377,397 A 6/1945 Booth
2,595,506 A 5/1952 Backman
(Continued)

FOREIGN PATENT DOCUMENTS

DE 4041765 A1 6/1992
DE 102008012717 A1 9/2009
(Continued)

OTHER PUBLICATIONS

International Search Report and Written Opinion for PCT/US18/65465 filed Dec. 13, 2018.
(Continued)

*Primary Examiner* — Brian E Glessner
*Assistant Examiner* — Adam G Barlow
(74) *Attorney, Agent, or Firm* — Galgano IP Law PLLC; Thomas M. Galgano; Edwin D. Schindler

(57) ABSTRACT

An anchor platform assembly for anchoring an object to a structure includes an anchor baseplate having a generally planar first surface and second surface, an elongated post coupled to the baseplate and projecting outwardly from the first surface thereof. The post has a first end secured to the anchor baseplate, a second free end, and an at least partially threaded, cylindrical blind bore extending from the first surface of the anchor baseplate into the post, with the second surface of the anchor baseplate being configured to allow the structure to lie generally flush against the second surface except for the area of the second surface covered by the post. A cylindrical mechanical fastener having a straight thread is
(Continued)

used for fastening an object to the anchor baseplate via the blind bore. A dual post anchor assembly is also disclosed.

64 Claims, 19 Drawing Sheets

Related U.S. Application Data is a continuation-in-part of application No. PCT/US2018/065465, filed on Dec. 13, 2018, which is a continuation of application No. 15/852,733, filed on Dec. 22, 2017, now Pat. No. 10,501,939.

(60) Provisional application No. 62/702,486, filed on Jul. 24, 2018, provisional application No. 62/632,453, filed on Feb. 20, 2018.

(58) Field of Classification Search
USPC .................................. 52/169.8, 296, 710
See application file for complete search history.

(56) References Cited

U.S. PATENT DOCUMENTS

| | | | |
|---|---|---|---|
| 3,245,181 A | 4/1966 | Stephenson | |
| 3,456,412 A | 7/1969 | Decombas | |
| 3,715,850 A | 2/1973 | Chambers | |
| 3,749,424 A | 7/1973 | Greene | |
| 3,868,732 A | 3/1975 | Engelhart | |
| 4,371,139 A | 2/1983 | Clark | |
| 4,490,083 A | 12/1984 | Rebish | |
| 4,658,946 A | 4/1987 | Adrian et al. | |
| 4,750,306 A | 6/1988 | Granieri | |
| 5,085,547 A | 2/1992 | Vanotti | |
| 5,309,688 A | 5/1994 | Robertson | |
| 5,596,845 A | 1/1997 | Strizki | |
| 5,603,187 A * | 2/1997 | Merrin | F24S 25/61 52/90.2 |
| 6,015,138 A | 1/2000 | Kohlberger | |
| 6,141,928 A | 11/2000 | Platt | |
| 6,290,212 B1 * | 9/2001 | Bartel | E04F 11/181 256/65.14 |
| 6,295,773 B1 | 10/2001 | Alty | |
| 6,361,258 B1 | 3/2002 | Heesch | |
| 6,439,817 B1 | 8/2002 | Reed | |
| 6,557,912 B1 | 5/2003 | Truong | |
| 6,568,145 B2 * | 5/2003 | Bartel | E04F 11/181 52/832 |
| 7,475,479 B1 | 1/2009 | Ross | |
| 8,448,405 B2 * | 5/2013 | Schaefer | E04D 13/00 52/60 |
| 8,479,455 B2 * | 7/2013 | Schaefer | H02G 3/088 52/220.8 |
| 8,752,338 B2 * | 6/2014 | Schaefer | F24S 25/61 52/173.3 |
| 8,833,033 B2 | 9/2014 | Schaefer et al. | |
| 9,097,017 B1 | 8/2015 | Vanlennep | |
| 9,347,232 B1 | 5/2016 | Francies, III | |
| 9,464,397 B1 | 10/2016 | Abraham | |
| 2001/0009087 A1 | 7/2001 | Valentz et al. | |
| 2003/0221385 A1 | 12/2003 | Platt | |
| 2005/0053449 A1 | 3/2005 | Grubert et al. | |
| 2005/0252124 A1 | 11/2005 | Bergman | |
| 2008/0240883 A1 | 10/2008 | Walling | |
| 2009/0293417 A1 | 12/2009 | Ren et al. | |
| 2010/0247270 A1 | 9/2010 | Cao | |
| 2011/0158766 A1 | 6/2011 | Mitrovic | |
| 2012/0090263 A1 | 4/2012 | Schaefer et al. | |
| 2012/0222380 A1 | 9/2012 | Wentworth et al. | |
| 2013/0000243 A1 * | 1/2013 | Steffen | F24S 25/61 52/704 |
| 2013/0145704 A1 | 6/2013 | Stein, Jr. | |
| 2013/0272816 A1 | 10/2013 | Vilas | |
| 2013/0291479 A1 * | 11/2013 | Schaefer | F24S 25/61 52/745.21 |
| 2014/0008506 A1 * | 1/2014 | Schaefer | E04C 3/06 248/237 |
| 2014/0101913 A1 | 4/2014 | Roddenberry | |
| 2014/0138596 A1 | 5/2014 | Ross | |
| 2015/0121797 A1 | 5/2015 | Brown et al. | |
| 2016/0017594 A1 | 1/2016 | Drummond et al. | |
| 2017/0175384 A1 | 6/2017 | Bergman | |
| 2018/0073241 A1 | 3/2018 | Lomax | |

FOREIGN PATENT DOCUMENTS

| | | |
|---|---|---|
| DE | 102010051320 A1 | 5/2011 |
| DE | 102011116877 A1 | 4/2013 |
| EP | 0926362 A1 | 6/1999 |
| EP | 3034893 A1 | 6/2016 |
| JP | 55-2073 U | 1/1980 |
| JP | 201210745 A | 6/2012 |
| JP | 2014152548 A | 8/2014 |
| JP | 5675295 B2 | 2/2015 |

OTHER PUBLICATIONS

International Search Report and Written Opinion for PCT/US19/18592 filed Feb. 19, 2019.
International Search Report and Written Opinion for PCT/US19/43264 filed Jul. 24, 2019.
International Search Report and Written Opinion for PCT/US19/046201 filed Aug. 12, 2019.
International Search Report and Written Opinion for PCT/US19/49549 filed Sep. 4, 2019.
International Search Report and Written Opinion for PCT/US20/18327 filed Feb. 14, 2020.
Communication dated Apr. 28, 2022 with Extended European Search Report.
India Patent Office, First Examination Report, dated Feb. 21, 2023, for India Patent Application No. 202117007427.
Japan Patent Office, Japanese Search Report for Applicant's Corresponding Japan Patent Application No. 2021-501000; Japanese Search Report dated Jun. 23, 2023.

* cited by examiner

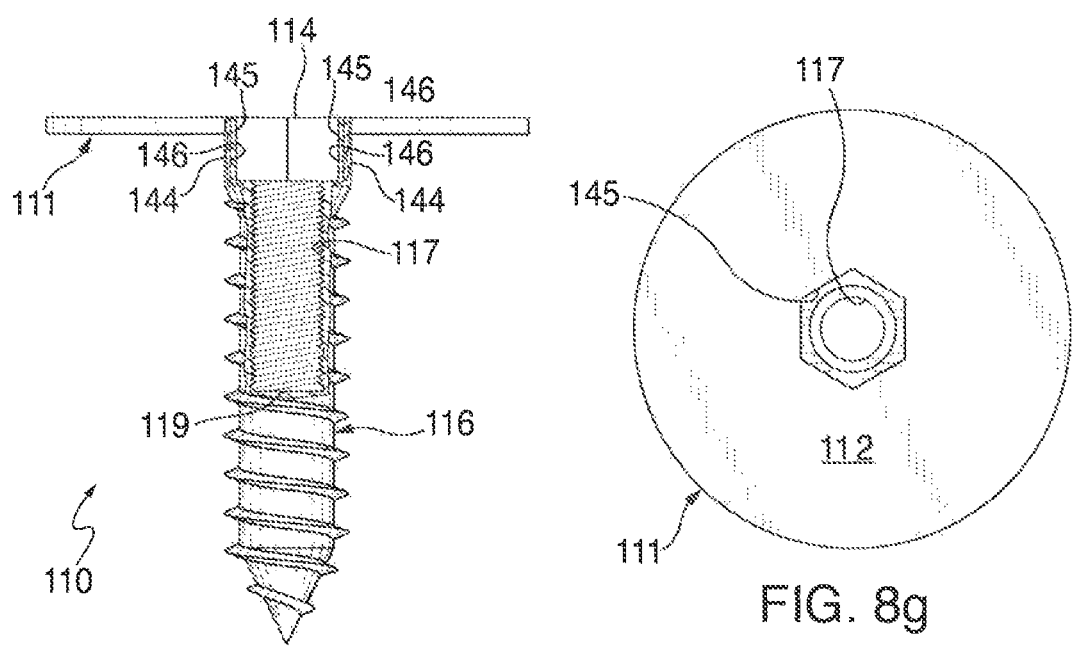
FIG. 8f
FIG. 8g
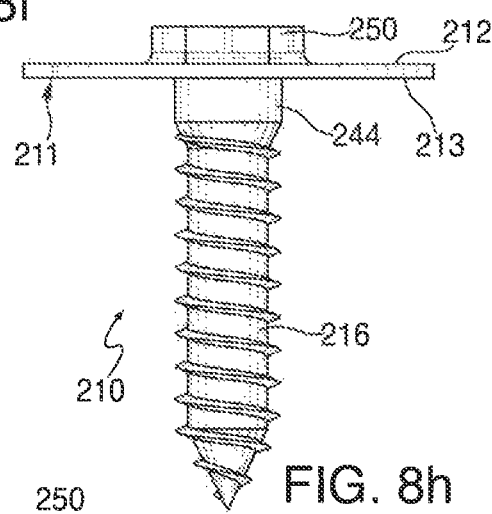
FIG. 8h
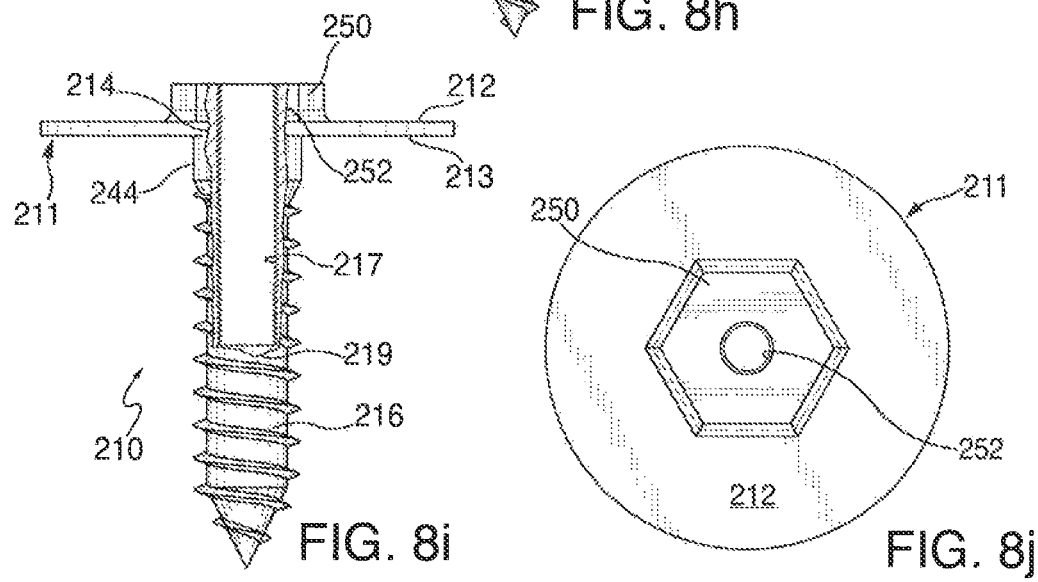
FIG. 8i
FIG. 8j

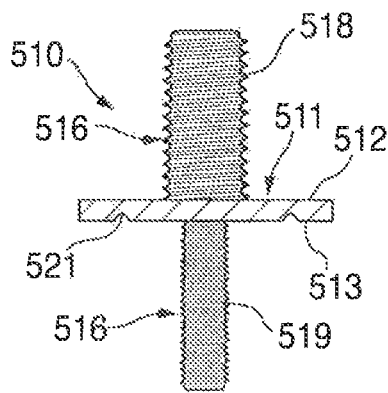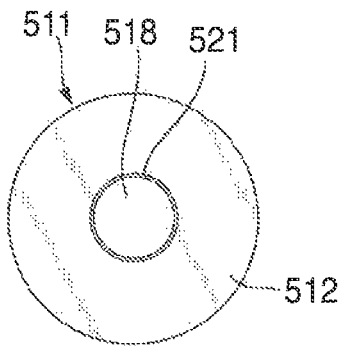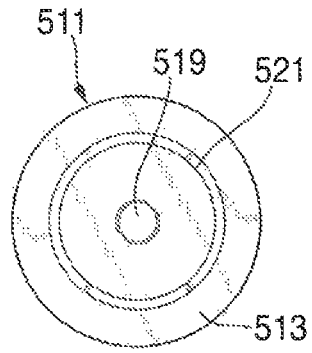
FIG. 17a  FIG. 17b  FIG. 17c
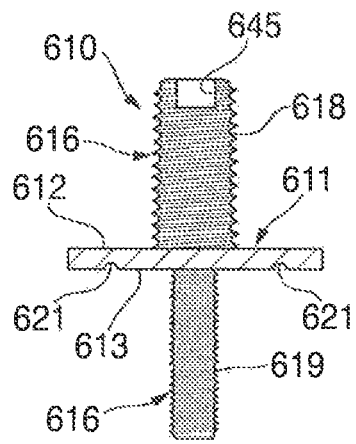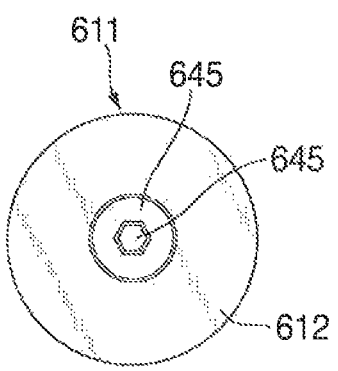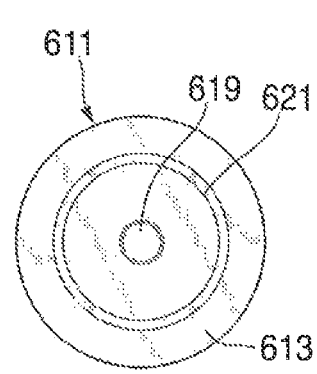
FIG. 18a  FIG. 18b  FIG. 18c
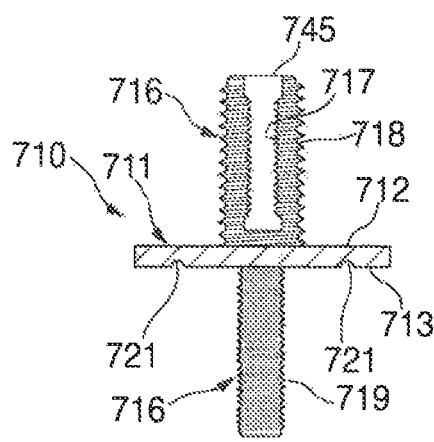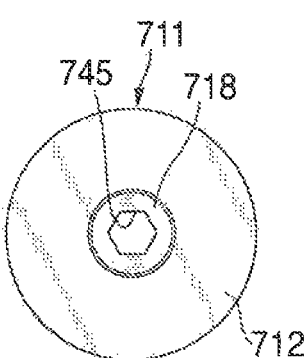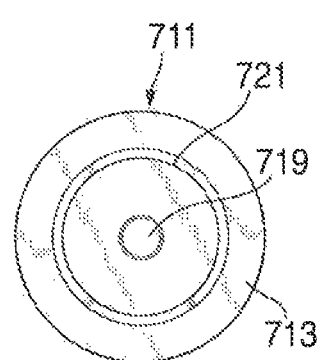
FIG. 19a  FIG. 19b  FIG. 19c

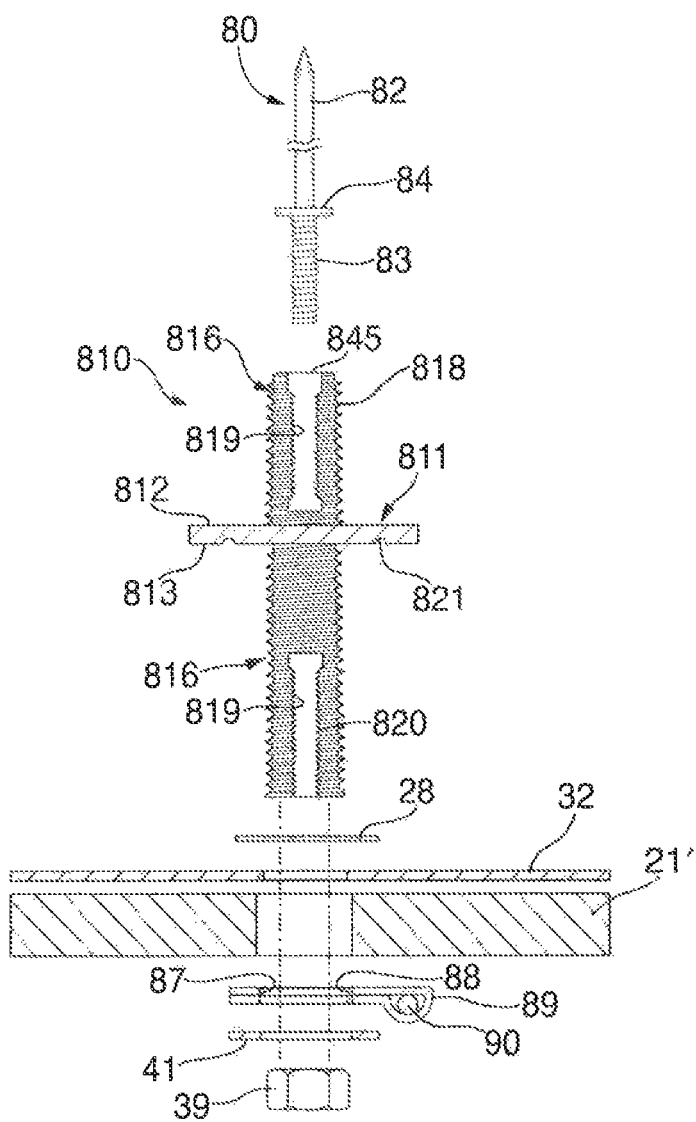
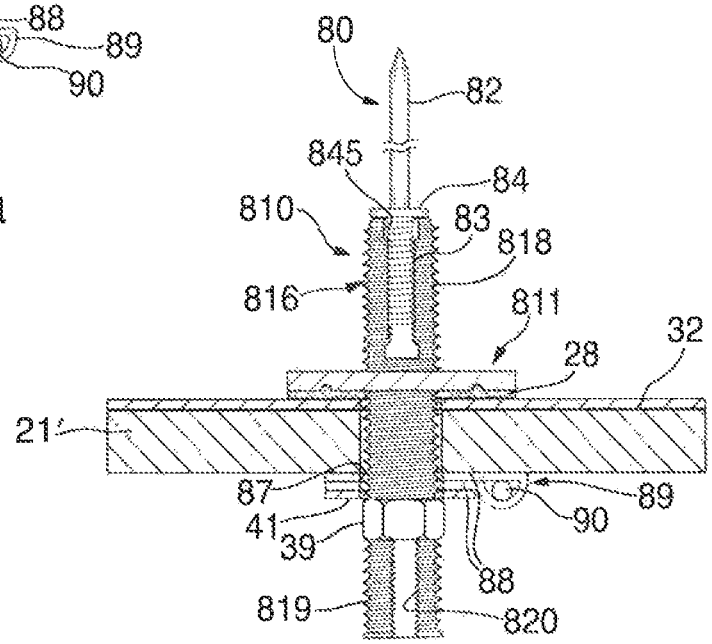
FIG. 22a
FIG. 22b

ANCHOR PLATFORM ASSEMBLY ESPECIALLY USEFUL FOR ROOF ACCESSORY STRUCTURES

This represents the U.S. National Phase patent application, pursuant to 35 U.S.C. §371, of P.C.T. Application No. PCT/US2019/043264, filed Jul. 24, 2019, which is a continuation-in-part of P.C.T. Application No. PCT/US2019/018592, filed Feb. 19, 2019, which is a continuation-in-part of P.C.T. Application No. PCT/US2018/065465, filed Dec. 13, 2018, which is a continuation of U.S. patent application Ser. No. 15/852,733, filed Dec. 22, 2017; each of which is incorporated herein by reference. The benefit of U.S. provisional patent application Serial No. 62/704,486, filed Jul. 24, 2018; and the benefit of U.S. provisional patent application Serial No. 62/632,453, filed Feb. 20, 2018, are claimed, pursuant to 35 U.S.C. §119(e), and incorporated by reference herein.

BACKGROUND OF THE INVENTION

Field of the Invention

An anchor platform assembly for anchoring and mounting an object to a support structure especially useful in the building trade for anchoring and mounting roof accessory structures on roofs and other raised, flat and pitched structures, terraces, balconies and the like, such as e.g., railings, solar panels, lightning rods, while affording a strong, robust and watertight connection.

BRIEF DESCRIPTION OF THE PRIOR ART

Various methods for mounting and waterproofing roof equipment, accessory structures or the like, which are attached to sloped or flat roofs, building terraces, roof decks, etc. are well known. In the roofing industry, there are many problems with water infiltration at equipment attachment points, particularly when flashing is not incorporated and/or sealants are solely relied on. A variety of sheathing methods and combinations thereof are used as water and moisture barriers on such structures, such as asphalt roof tiles, poured or sheeted plastic or rubber membranes and the like. Currently, more and more heavy roof structures are being mounted on roofs such as, e.g., solar panels, satellite dishes, HVAC equipment, etc.

Especially for roof decks, balconies, terraces and the like, glass walls and/or railings are being mounted to avoid viewing obstructions such as would normally be the case with a wooden, cable or metal fence. These generally heavy structures must also be anchored to the roof structures. However, because of the loads they generate and the manner in which they are mounted, typically with anchors bolted through the roof, they create a "conduit" for water to penetrate through the roof, notwithstanding the fact that adhesives or glues are often used to seal the conduit in an attempt to prevent such water penetration.

In fact, over time, these heavy structures as a result of normal repetitive roof movement or shifting caused by, e.g., settling, temperature changes, and/or high winds, cause cracks in the adhesive or glues employed and cause eventual roof leaks. As a result, it is difficult for many of the installers to provide guarantees or obtain insurance against water or moisture damage caused by such conventional anchoring and mounting systems.

The present invention seeks to overcome this problem by providing a novel anchoring and mounting system which avoids such problems in a highly advantageous and effective manner.

Accordingly, it is an object of the present invention to provide a novel anchor platform assembly usable for a wide variety of applications, especially for anchoring equipment and/or roof accessory structures to roofs and the like, which can accommodate heavy loads and provide waterproof protection at the equipment and/or roof accessory structure attachment points.

It is a further object of the present invention to provide such a novel anchor platform assembly which is relatively simple in design and construction, easy to install and is relatively inexpensive to make.

It is another object of the present invention to provide such a novel anchor platform assembly which can be used for a variety of roof or raised structures, including both flat roofs and pitched roofs, as well as roof decks, outdoor balconies, terraces and the like.

It is yet another object of the invention to provide such a novel anchor platform assembly which is more reliable than prior art systems in providing a waterproof connection at the equipment attachment or accessory points.

It is a more particular object of the present invention to provide such a novel anchor platform assembly which is universally adaptable for anchoring and mounting a multitude and wide variety of objects to support structures, such as, e.g., roof accessory structures including, inter alia, lightning rods, antennas, solar panels, satellite dishes, safety rails, glass railings, HVAC heating and air conditioning equipment, decorative sculptures, holiday ornaments, and the like, etc., while at the same time providing a watertight connection.

SUMMARY OF THE INVENTION

Certain of the foregoing and related objects are achieved according to the present invention by the provision of an anchor platform assembly for anchoring an object to a structure, which includes an anchor baseplate having a generally planar first surface and second surface, an elongated post coupled to said baseplate and projecting outwardly from said first surface thereof, said post having a first end secured to said anchor baseplate and a second free end, and an at least partially threaded, cylindrical blind bore extending from said first surface of said anchor baseplate into said post, with said second surface of said anchor baseplate being configured to allow the structure to lie generally flush against said second surface except for the area of said second surface covered by said post, and means for fastening an object to said anchor baseplate via said blind bore comprising a cylindrical mechanical fastener having a straight thread.

Preferably, the assembly additionally includes means for fastening said anchor baseplate to a structure with said second surface thereof lying generally flush against the structure except for the area of said second surface covered by said post.

In a preferred embodiment, the anchor baseplate is rectangular, the blind bore is generally centrally-disposed in the anchor baseplate and the anchor baseplate has a plurality of spaced-apart, ancillary through holes spaced from the blind bore and disposed generally adjacent to the periphery of the anchor baseplate. Most advantageously, the assembly includes a plurality of mechanical fastening members, each receivable through one of the ancillary holes for fastening the anchor baseplate to the structure and a mechanical fastener threadably receivable in the centrally disposed threaded blind bore for anchoring an object thereto. Preferably, the plurality of mechanical fastening members are screws and the mechanical fastener member receivable in the centrally-disposed threaded blind bore is a threaded bolt.

Most desirably, the threaded bolt has an enlarged head and a threaded stem having said straight thread. In a preferred embodiment, the anchor baseplate post is cylindrical and its external surface is either smooth or at least partially externally threaded. In the latter case, the assembly desirably includes a nut receivable on said externally threaded post for securing said anchor platform assembly to the structure from below. In a particularly preferred embodiment, the anchor baseplate has a non-threaded throughbore which merges with said blind bore and said post has a reduced diameter neck portion adjacent its first end which is configured and dimensioned for receipt within said non-threaded throughbore.

Preferably, the anchor platform assembly also includes an object support member having a base wall and a bore formed there through which is positionable on said anchor baseplate so that the base wall bore is aligned with said threaded blind bore. Advantageously, the assembly further includes an elongated and U-shaped support for an object which has a generally planar base wall, a support stand having a planar base and an upstanding tubular body member joined to the planar base, with the planar base having a throughbore formed therethrough alignable with the blind bore of the anchor baseplate and the tubular body member having opposing sidewalls, each having a throughbore aligned with the throughbore in the opposing sidewall. The assembly also includes an object support member having at least one base wall with a throughbore extending therethrough, means for mechanically fastening the object support member to the support stand via the sidewall throughbores of the support stand and the wall of the object support stand, and means for mechanically fastening the support stand to the anchor baseplate via the throughbore of the base wall thereof and the threaded blind bore of the anchor baseplate.

In another embodiment of the invention, the assembly additionally includes a lightning rod as said object, and said lightning rod has a lower end, and said means for fastening an object is provided on said lower end which is threadably receivable in said blind bore. Advantageously, an enlarged collar is provided on said lighting rod above said lower end thereof. Alternatively, the lightning rod has a lower end with a nut coupled thereto which is threadably receivable on said externally-threaded post.

Most advantageously, the anchor baseplate is bent to permit the same to be mounted on a pitched roof. Desirably, the anchor baseplate has a planar central portion through which said blind bore extends and a pair of downwardly extending wings joined to, and extending from, opposite sides of said planar central portion. Preferably, the assembly additionally includes a clamp for a grounding cable and wherein said clamp is threadably receivable on said externally-threaded post. In a further embodiment of the invention, the post comprises an at least partially threaded screw and the anchor baseplate comprises a flange. Desirably, the flange is a generally circular, planar flange. Most desirably, a polygonally-shaped nut having a throughbore is affixed to the top surface of said baseplate with its throughbore in axial alignment and registry with said blind bore of said baseplate. Most advantageously, the polygonally-shaped nut is a hexagonally-shaped nut.

Most desirably, the screw has an upper tubular neck portion having a throughbore with an open top end and open bottom end, and wherein said bottom open end thereof merges with a threaded bore within a lower externally threaded shaft portion which together define said at least partially threaded blind bore of said post. Optimally, the throughbore of said neck portion is at least partially threaded.

In a still further preferred embodiment, the blind bore has a longitudinally-extended axis and said assembly additionally includes means for rotating said anchor about said axis of said blind bore. The means for rotating preferably comprises a port formed adjacent and within said open top end of said blind bore in said post or screw which is configured and dimensioned to accommodate a tool for rotating said anchor into a support structure. The port can be configured and dimensioned as a flat head screw slot or an Allen Key port.

The assembly preferably includes a lightning rod as said object, and said lightning rod has a lower end, and said means for fastening an object is provided on said lower end which is threadably receivable in said blind bore. Desirably, an enlarged collar is provided in said lighting rod above said lower end thereof. Advantageously, a clamp for a grounding cable and said clamp is threadably receivable on said lower end of said lightning rod below said enlarged collar thereof. Alternatively, a clamp for a grounding cable is provided which serves as said object, and said clamp is receivable on said lower end of said lightning rod or on an externally-threaded post.

Certain of the foregoing and related objects are also attained in an anchor platform assembly for anchoring an object to a structure, comprising an anchor baseplate having a generally planar first surface and second surface, two cylindrical posts, each have a first end secured to said anchor baseplate with said first ends thereof secured to each other, and with at least one of said posts extending into said throughbore in said anchor baseplate so that said two posts are in axial alignment and registry with said anchor baseplate throughbore and extend perpendicularly outwardly from said anchor baseplate, said posts each having a second free end and wherein said second surface of said anchor baseplate is configured to allow the structure to lie generally flush against said second surface except for the area of said second surface covered by said post, and means for fastening an object to said anchor baseplate via at least one of said posts comprising a cylindrical mechanical fastener having a straight thread. Preferably, at least one or both of said posts is externally-threaded. Desirably at least one post comprises an at least partially threaded cylindrical stud having a straight edge. Advantageously, at least one of said posts has an at least partially threaded cylindrical blind bore formed therein opening onto said free second end thereof.

Preferably, the assembly additionally includes means for fastening an object to at least one of said posts. It desirably includes an L-shaped support for a solar panel having a throughhole which is receivable on one of said externally-threaded posts. A nut receivable on said one of said externally threaded posts may be provided to clamp said L-shaped support against the anchor baseplate. Advantageously, both said posts has an at least partially threaded cylindrical blind bore formed therein opening into said free second ends thereof. In a preferred embodiment, the two posts have different or the same diameters.

Advantageously, the anchor plate has a channel formed on at least one side thereof for receipt therein of an adhesive.

The channel is preferably circular and is spaced outwardly of said throughbore in said anchor baseplate.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention. In the drawings:

FIG. 8b is a side elevational view, in part section, of the flush screw anchor assembly shown in FIG. 8a;

FIG. 8f is a side elevational view, in part section of a flush screw anchor assembly, similar to FIG. 8b, but showing the optional provision of an Allen key port;

FIG. 8g is a top plan view of the flush screw anchor assembly shown in FIG. 8f;

FIG. 8h is a side elevational view of a raised hex head screw anchor and fastener assembly according to a fifth embodiment of the present invention;

FIG. 8i is a side elevational view, in part section, of the hex head screw anchor assembly shown in FIG. 8h;

FIG. 8j is a top plan view, in part section, of the hex head screw anchor assembly shown in FIG. 8h;

FIG. 17a is a side elevational view of a dual post anchor baseplate assembly according to a twelfth embodiment of the invention having an externally-threaded, cylindrical upper and an externally-threaded, cylindrical lower post, the latter of which has a smaller diameter than the upper post;

FIG. 17b is a top plan view of the dual post anchor baseplate assembly shown in FIG. 17a;

FIG. 17c is a bottom plan view of the dual post anchor baseplate assembly shown in FIG. 17a;

FIG. 18a is a side elevational view of a dual post anchor baseplate assembly according to a thirteenth embodiment of the present invention having an externally-threaded, cylindrical upper post with an Allen key port and an externally-threaded, cylindrical lower post, the latter of which has a smaller diameter than the upper post;

FIG. 18b is a top plan view of the dual post anchor baseplate assembly shown in FIG. 18a;

FIG. 18c is a bottom plan view of the dual post anchor baseplate assembly shown in FIG. 18a;

FIG. 19a is a side elevational view of a dual post anchor baseplate assembly according to a fourteenth embodiment of the present invention having an externally-threaded, cylindrical upper post with a threaded blind bore and an externally-threaded, cylindrical lower post, the latter of which has a smaller diameter than the upper post;

FIG. 19b is a top plan view of the dual post anchor baseplate assembly shown in FIG. 19a;

FIG. 19c is a bottom plan view of the dual post anchor baseplate assembly shown in FIG. 19a;

FIG. 20b is a top plan view of the dual post anchor baseplate assembly shown in FIG. 20a;

FIG. 20c is a bottom plan view of the dual post anchor baseplate assembly shown in FIG. 20a;

FIG. 22a is an exploded, side elevational view of a dual post anchor baseplate assembly utilizing the dual post anchor baseplate assembly of FIG. 20a to anchor a lightning rod to its externally-threaded, cylindrical upper post above the roof and a grounding cable to the externally-threaded, cylindrical lower post below the roof; wherein both posts have an internally-threaded inner blind bore; and FIG. 22b is a side elevational view of the anchor baseplate assembly shown in FIG. 22a in a fully mounted state.

DETAILED DESCRIPTION OF THE PREFERRED EMBODIMENTS

Figure 1:
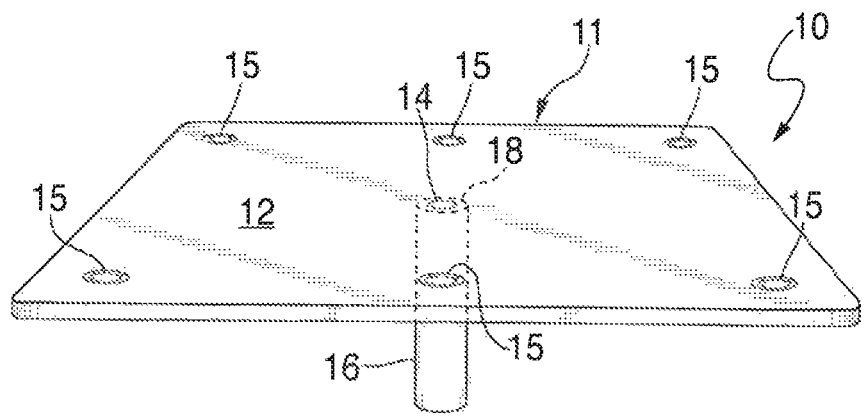
FIG. 1 is a top and side perspective view of a first embodiment of an anchor baseplate utilized in an anchor platform assembly embodying the present invention.
Figure 2:
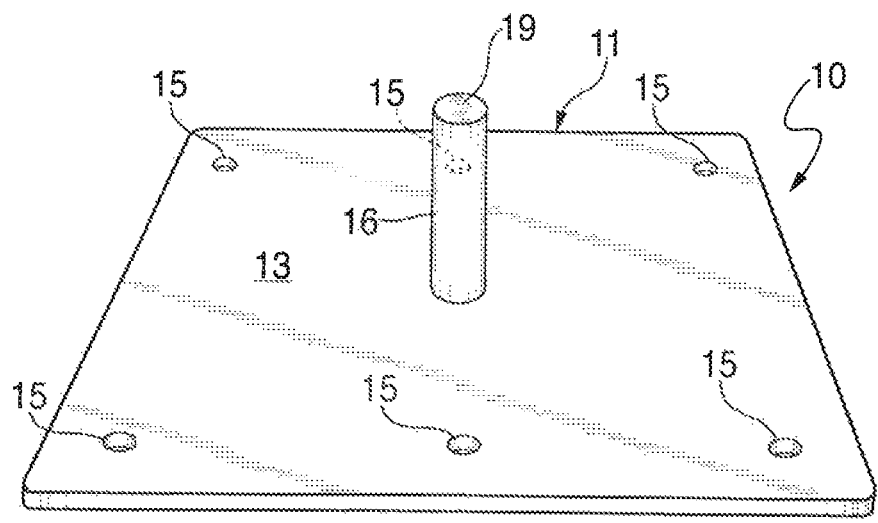
FIG. 2 is a bottom and side perspective view of the anchor baseplate shown in FIG. 1.

Turning now in detail to the drawings and, in particular, to FIGS. 1-7b thereof, therein illustrated is a novel anchor platform assembly embodying the present invention, as more particularly described and shown in Applicant's aforementioned U.S. patent application Ser. No. 15/852,733 and Application No. PCT/US2019/018592 for anchoring objects to a support structure, especially intended for a wide variety of anchoring applications which are universally adaptable to many different fields of use.

FIGS. 1-4c thereof illustrates a first embodiment of the present invention which comprises a novel anchor platform assembly, generally designed by reference numeral 10, especially designed for anchoring roof accessory structures to roofs and other raised, flat and/or pitched structures, such as terraces, balconies, stairs and the like. The main component of the anchor platform assembly is the anchor baseplate, generally designated by reference numeral 11, which preferably is made of stainless steel (but could be made of other metals, such as aluminum, bronze, etc.), and is preferably square or rectangular shaped and has a top surface 12 and a bottom surface 13. The anchor baseplate 11 has an internally-threaded central through bore 14 and six spaced apart peripheral through bores 15 positioned radially outward from the center bore 14 and generally adjacent to the periphery of the baseplate 11. In this embodiment, the anchor baseplate 11 also includes a preferably cylindrical rod or post 16 having an axially-extending, internally-threaded bore 17 (see FIG. 4b) having a top open end 18 and a closed bottom 19 (FIG. 2) which is secured preferably via welding to the anchor baseplate 11 so that the top open end 18 of its bore 17 abuts and is in registry with the bottom open end of center through bore 14 (see FIG. 4b).

Figure 3:
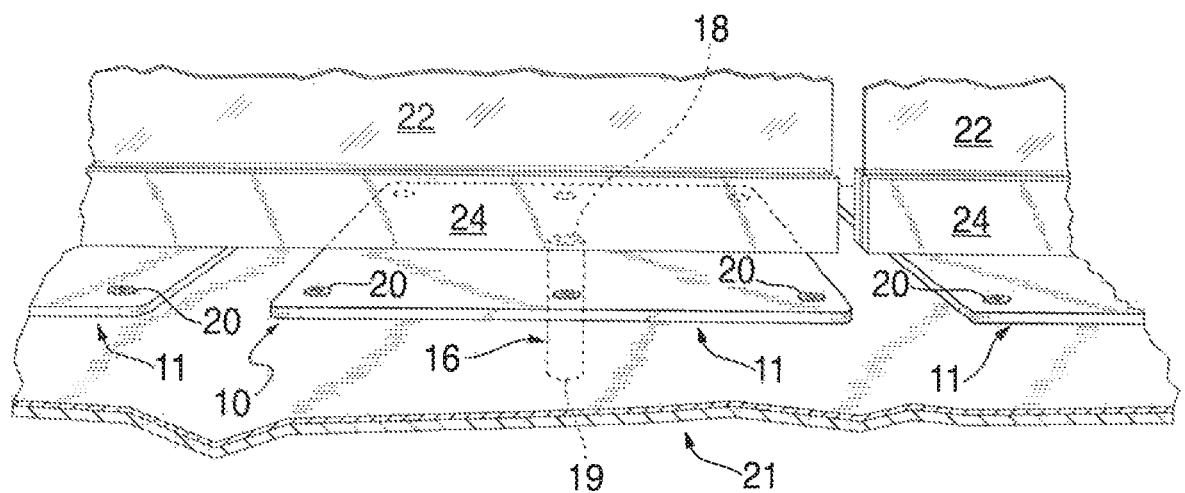
FIG. 3 is a fragmentarily-illustrated, perspective view of a first embodiment of the anchor platform assembly embodying the present invention employing a plurality of serially-arranged, spaced-apart, anchor baseplates mounted on a roof deck and anchoring thereto a plurality of spaced-apart elongated rails each having a U-shaped channel or shoe which supports a pair of glass railings.

As shown in FIG. 3, the anchor baseplate 11 of the anchor platform assembly 10 is typically mounted via mechanical fastening elements 20 preferably in the form of nails, bolts, or lag screws, to a roof structure, such as a roof deck, generally designated 21, with its cylindrical post 16 extending through the roof deck 21 and projecting below the roof deck with its closed end 19. The internally threaded and aligned bores 14 and 17 serve as an anchor point for an object to be mounted on the roof deck 21. In this case, the object is a glass railing of the type that has glass panel 22 with a lower edge secured within an elongated U-shaped metal channel or shoe 24. FIG. 3 specifically depicts three serially arranged and spaced apart anchor baseplates 11 to which two glass panels 22 and two shoes 24 are at least partially mounted. In use, such glass railings can be hundreds of feet in length. As can be appreciated, depending on the length of each glass railing 22, two or more anchor baseplates 11 per glass rail 22 may be required as shown in FIG. 3.

Figure 4A:
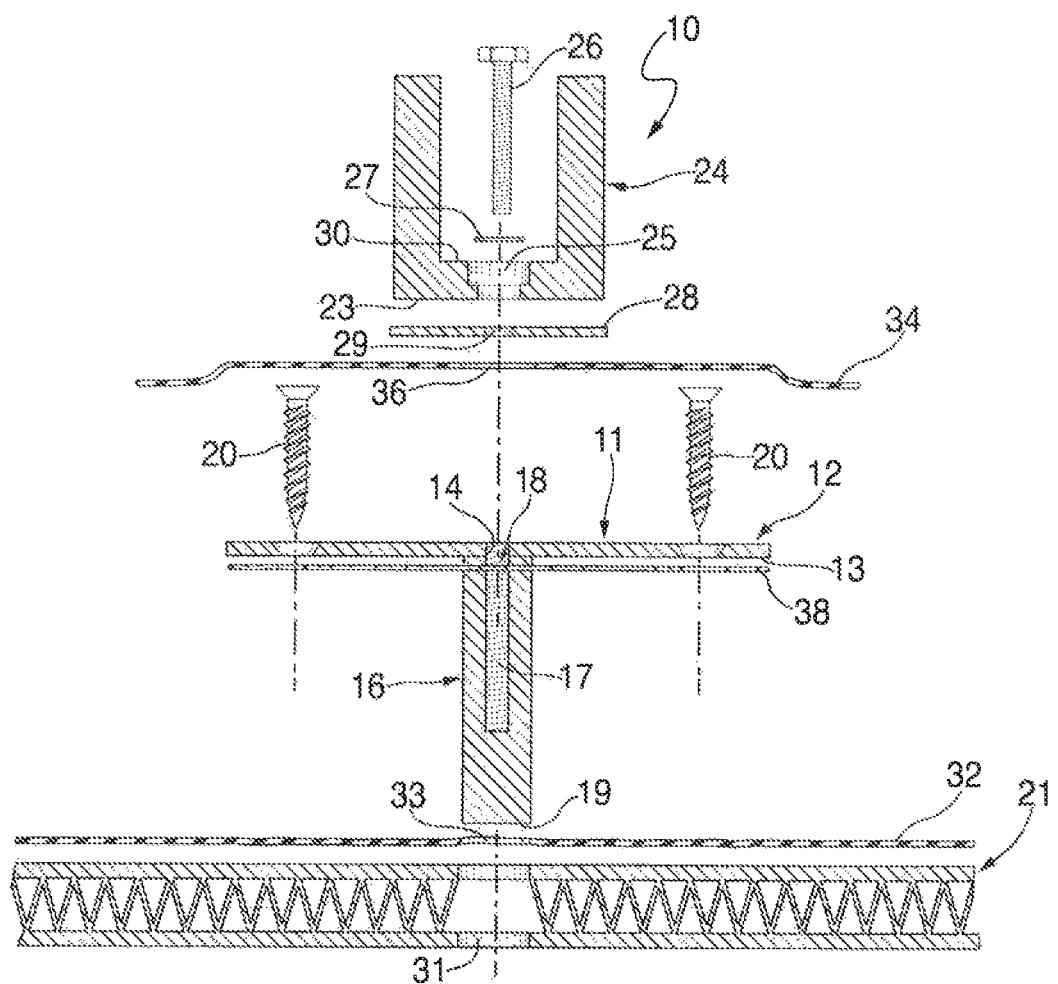
FIG. 4a is an exploded, cross-sectional view of the anchor platform assembly including the anchor baseplate in positional relationship with respect to the U-shaped shoe and the roof deck shown in FIG. 3 and further showing the roof flashing materials, fasteners and adhesives employed therewith.
Figure 4B:
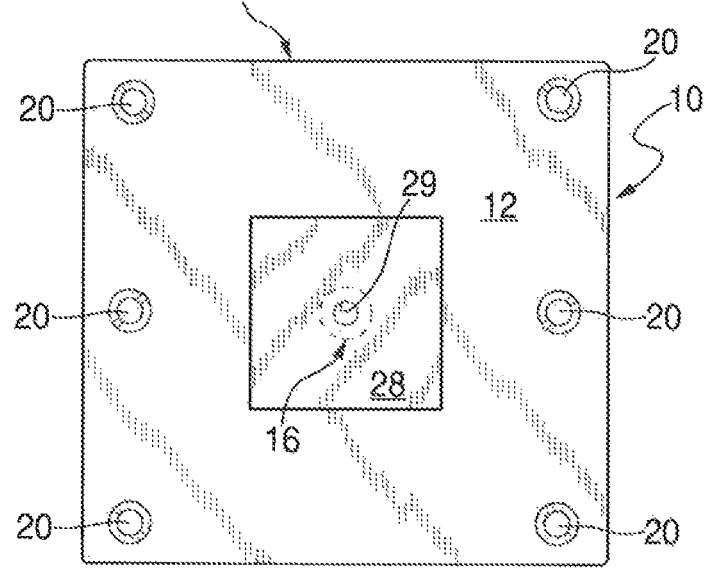
FIG. 4b is a plan view of the anchor baseplate and an optional shim plate centered thereon for adjusting the height of the rail.
Figure 4C:
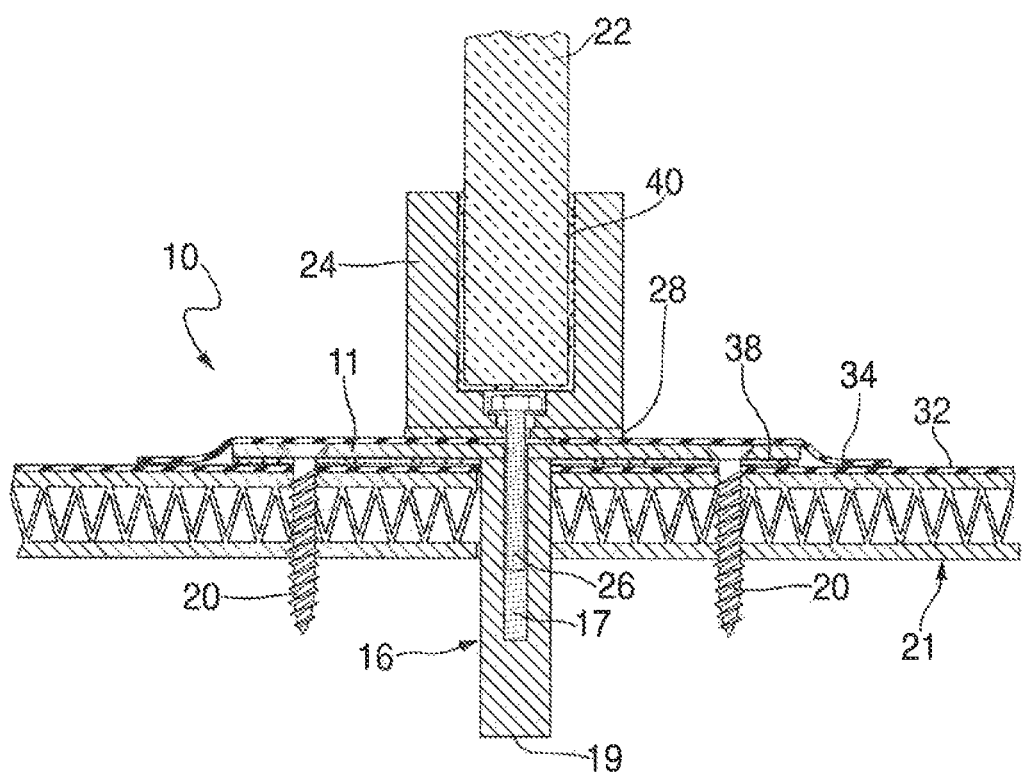
FIG. 4c is a cross-sectional view of the anchor platform assembly shown in FIG. 4a in a fully, mounted state on a roof deck whereby the glass rail is anchored via its U-shaped shoe to the roof.

As seen best in FIGS. 4a and 4c, an elongated U-shaped shoe 24 has a base wall 23 with a plurality of spaced apart through bores 25 (only one of which is shown). As will be discussed in greater detail hereinafter, cylindrical mechanical fasteners having a straight-thread are used, such as a threaded bolt 26, and washer 27, which bolt 26 is receivable through the through bore 25 of the U-shaped shoe 24 and is receivable within the internally-threaded center bore 14 of anchor baseplate 11 and internally-threaded blind bore 17 of the cylindrical post or rod 16 (FIG. 4c) to anchor the same to the roof deck 21. The cylindrical post 16 with the closed bottom 19 serves two purposes: (1) it provides a relatively sturdy and rigid anchoring support point for the object to be mounted on the roof, and (2) it prevents water from penetrating via the central bore 14 into and below the roof deck 21 as a result of blind bore 17 and the bottom end 19 of the cylindrical rod 16 being closed.

FIG. 4b shows the use of a square-shaped shim plate 28 having a central through bore 29 mounted atop the anchor baseplate 11 such that its central through bore 29 is directly over and in registry with the internal blind bore 17 of the cylindrical post 16. The shim plate 28 is used to adjust the height of the shoe 24 to ensure proper alignment of adjacent shoes 24 and the glass railing(s) 22 they support due to variations in height of the roof deck 21 or the like. Additional shim plates 28 can, of course, be used, if needed, to achieve proper height alignment.

As illustrated in FIGS. 4a and 4c, the central throughbore 25 of the U-shaped channel or shoe 24 contains a step which is dimensioned and configured to receive and support the bolt head of bolt 26 and washer 27 on the step so that the bolt head of bolt 26 is disposed below the top surface 30 of the lower base wall 23 of U-shaped shoe 24 so as not to abut and possibly crack or damage the bottom edge of the glass railing 22.

FIGS. 4a and 4c respectively show an exploded cross-sectional view and a fully mounted cross-sectional of the anchor platform assembly 10 which include preferred flashing materials, fasteners and adhesives and the like for mounting a glass railing to a roof deck or terrace or the like. As shown in FIG. 4a, the anchor baseplate 11 is positioned above the roof deck 21 which may be of wood, metal or composite construction as is standard or conventional in the industry. The cylindrical post 16 of the anchor baseplate 11 is intended to be inserted through a through bore 31 in the roof deck 21 and a throughbore 33 of a conventional rubber roof membrane 32, preferably made of neoprene, and preferably interposed between the anchor baseplate 11 and roof deck 21. Similarly, a conventional rubber roof membrane 34, also preferably made of neoprene, is preferably positioned between the optional shim plate 28 and the top surface 12 of the anchor baseplate 11 and it too is provided with a central bore 36 to allow the bolt 26 to pass through the membrane 34. In addition, a sealant, cement, caulk or adhesive layer 38 is shown which would normally be applied to the bottom surface 13 of the anchor baseplate 11 to adhesively join and seal the same to the roof membrane 32.

As also shown in FIG. 4c, an adhesive, caulk, cement or glue 40 (and/or optionally clips) is also applied to the inner surface of the U-shaped channel 24 so that it surrounds the lower end of glass railing 22 received within the U-shaped metal channel 24. As also illustrated therein, the anchor baseplate membrane 34 extends over the entire anchor baseplate 11 with its ends sealed against the roof membrane 32 thereby sealing the screw holes and the remainder of the anchor baseplate 11. As can be appreciated, these flashing materials and adhesives serve to waterproof the assembly and protect the roof from leaks.

As previously mentioned, this is particularly important at the point of attachment of the object to the roof which, in this case, refers to the point of attachment of the glass railing shoe 24 to the anchor baseplate cylindrical post 16 via bolt 26 and the blind threaded bore 17 in which the bolt 26 is received. Since bore 17 is a blind bore or hole and the bottom 19 end of the cylindrical post 16 is closed, the potential path of any water that could conceivably penetrate between the glass panel 22 and the U-shaped channel 24 and enter the bore 17 of the cylindrical post 16 is totally blocked from penetrating the roof deck 21.

Figure 5A:
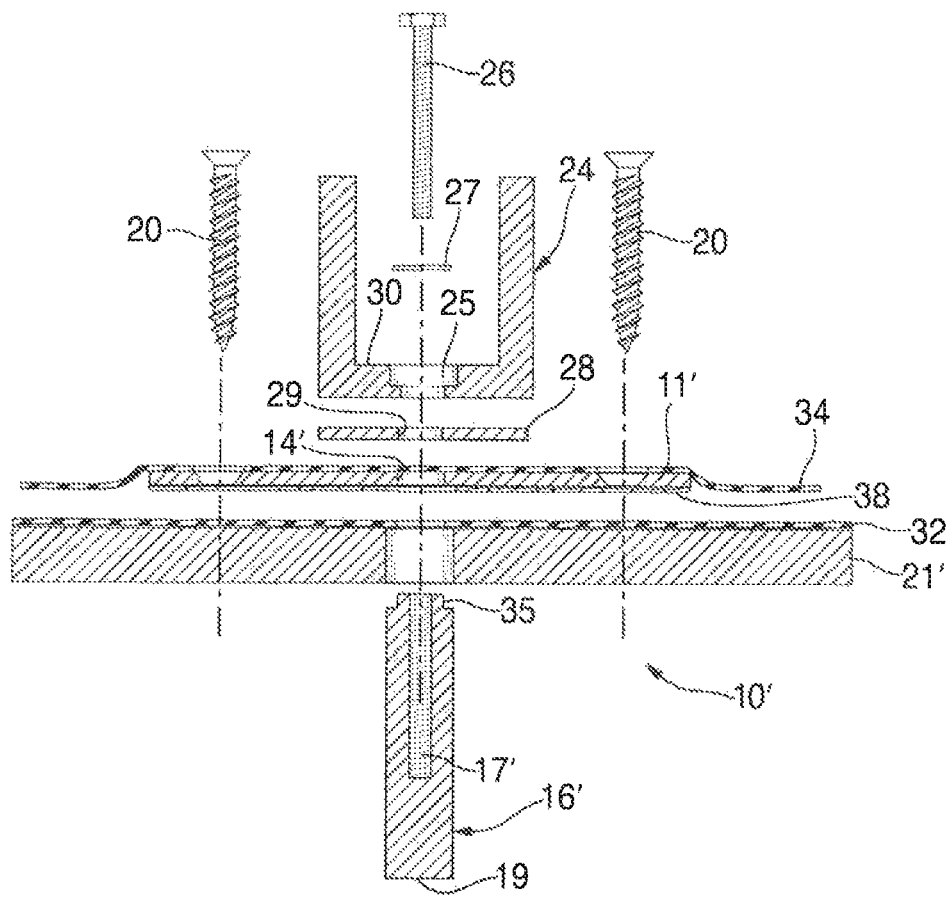
FIG. 5a is an exploded, cross-sectional view of a second embodiment of the anchor platform assembly comparable to FIG. 4a, but showing the anchor baseplate having an internally threaded post with a reduced width neck section.
Figure 5B:
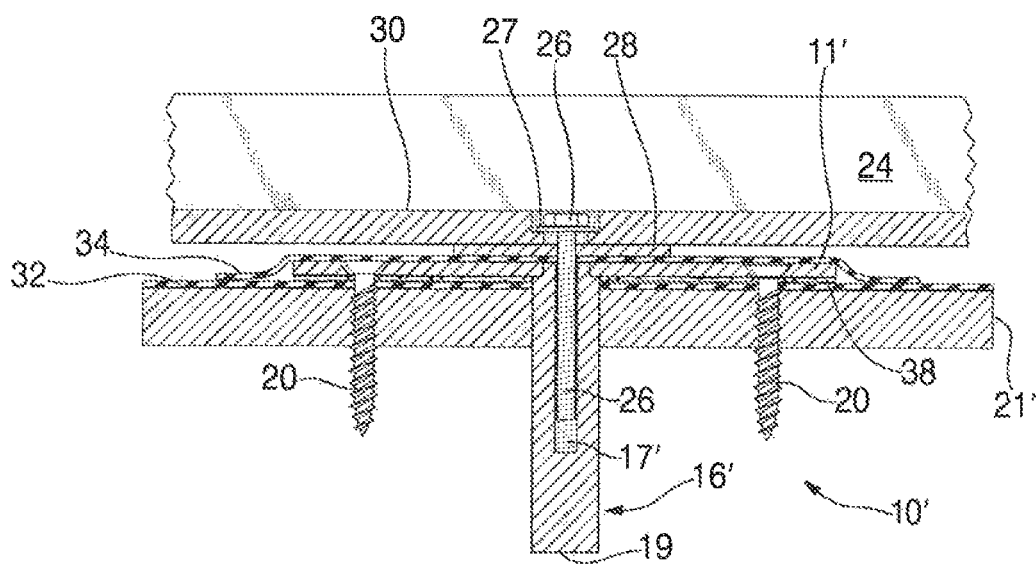
FIG. 5b is a cross-sectional view of the second embodiment of the invention in a fully mounted state, comparable to FIG. 4c, but showing the use of an internally threaded post with a reduced width neck section seated within the central bore of the anchor baseplate.

FIGS. 5a and 5b illustrate a second embodiment of the anchor baseplate assembly 10' and, in a similar fashion, respectively show an exploded cross-sectional view and a fully mounted cross-sectional view of this second embodiment of the anchor platform assembly 10'.

The elements shown in this second embodiment are the same as shown in FIGS. 4a and 4c with the exception that the cylindrical post 16' is provided with a narrow neck portion 35 and the baseplate 11' is provided with a non-threaded central bore 14', but both are otherwise identical to the baseplate 11' and cylindrical post 16 shown in the previous embodiment. In FIGS. 4a and 4c, the top end 18 of the cylindrical post 16 would typically be welded to the bottom surface 13 of the anchor baseplate 11'. In FIGS. 5a and 5b however, the narrow neck section 35 is intended to be received within the non-threaded central bore 14' of the anchor baseplate 11' and as a result of this construction, a more robust, and stronger bond is made. The stronger bond is due to the fact that when anchor plate 11' and post 16' are welded together with the respective center bore 14' and internal threaded bore 17' being held in proper axial alignment by the reduced neck section 35 of the post 16' being received in the center bore 14', the narrow neck portion extending into the non-threaded central bore 14'.

Figure 6A:
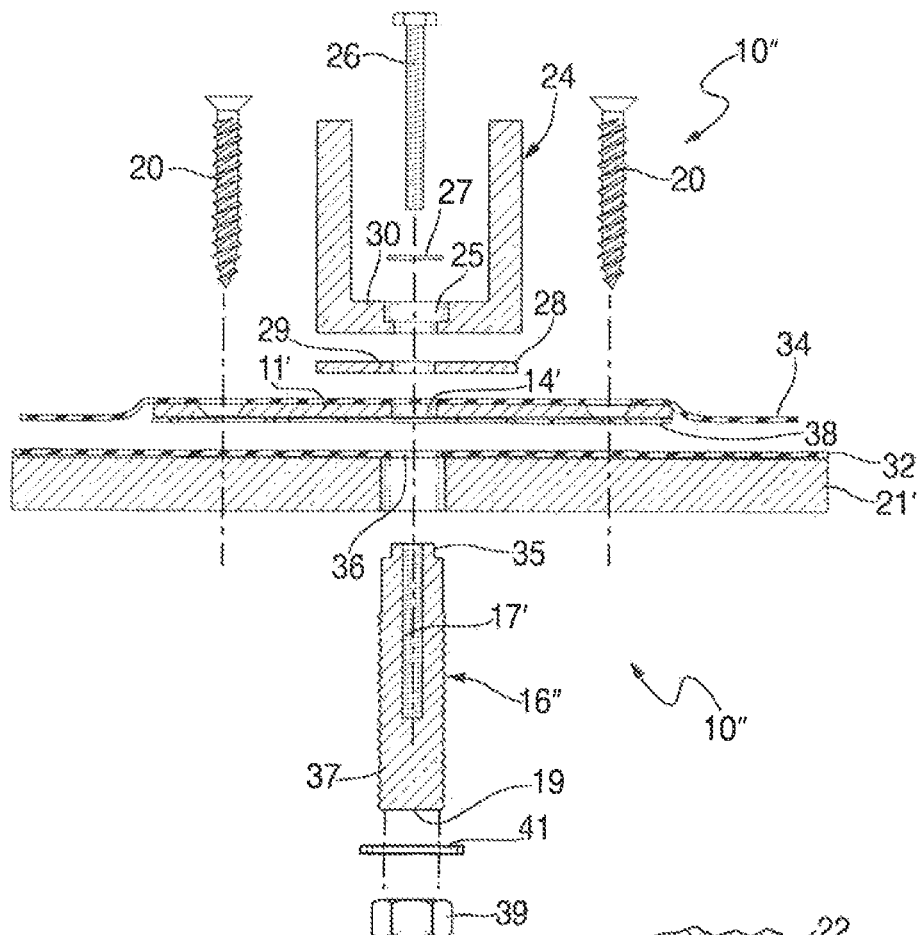
FIG. 6a is an exploded, cross-sectional view of a third embodiment of the anchor platform assembly comparable to that shown in FIGS. 4a and 5a, but showing an anchor baseplate having an externally threaded post.
Figure 6B:
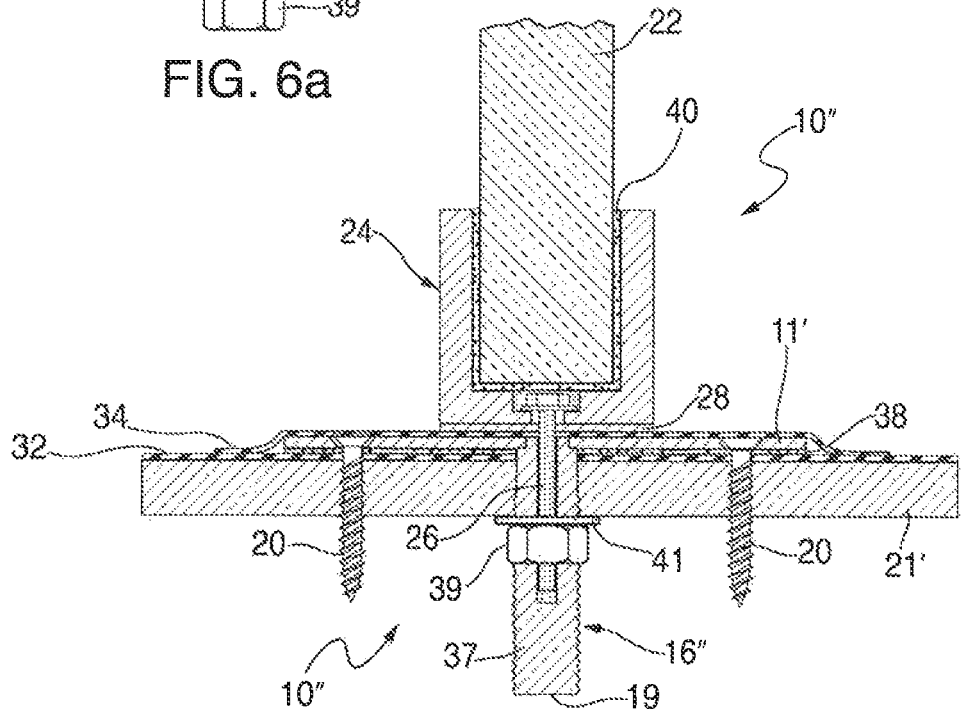
FIG. 6b is a cross-sectional view of the third embodiment of the anchor platform assembly in a fully mounted state comparable to that of FIGS. 4c and 5b, but showing the externally threaded post securing the anchor baseplate to the roof deck from beneath the roof deck via a nut and a washer.

FIGS. 6a and 6b illustrate a third embodiment of the anchor baseplate assembly 10" and, in a similar fashion, respectively show an exploded cross-sectional view and a fully mounted cross-sectional view of this third anchor platform assembly embodiment. The elements shown in this third embodiment are the same as shown in FIGS. 5a and 5b with the exception that the lower portion 37 of cylindrical post 16" is externally threaded but is otherwise identical to the cylindrical post 16'. In this embodiment, a nut 39 and washer 41 are threaded onto the externally threaded surface 37 of the cylindrical post 16" so that in the fully assembled state shown in FIG. 6b, the nut 39 and washer 41 are tightened against the lower surface of the metal roof deck 21' to provide a stronger point of attachment while, at the same time, preventing roof leaks at the point of attachment via the blind bore 17' and the closed end 19 of the cylindrical post 16".

Figure 7A:
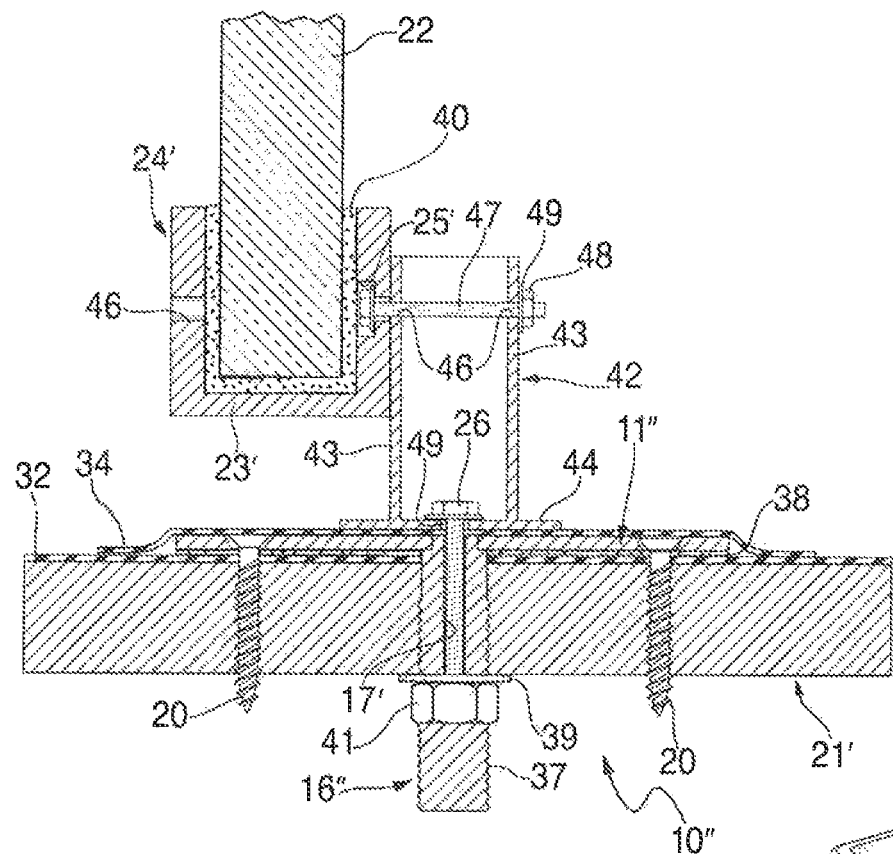
FIG. 7a is a cross-sectional view similar to FIG. 6b, but showing an accessory unit supporting the glass railing and its supporting shoe in a raised position, spaced above the roof deck and offset from the center hole in the anchor baseplate.
Figure 7B:
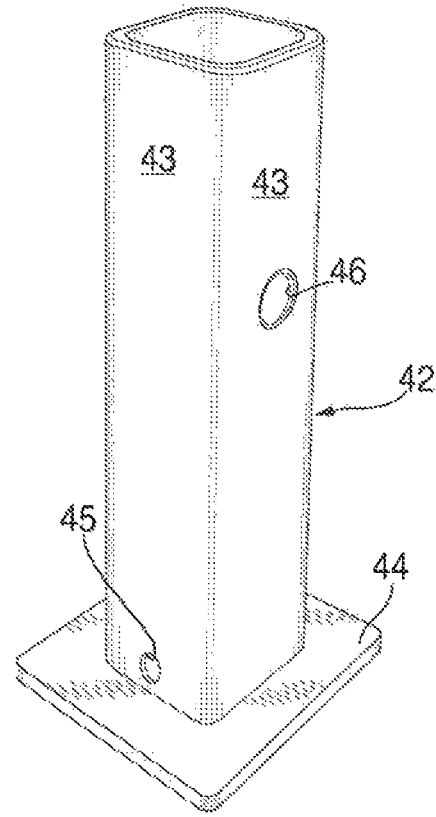
FIG. 7b is a perspective view of an anchor platform assembly accessory unit for supporting a roof accessory structure in an offset and raised arrangement relative to the anchor baseplate and roof deck, respectively.

FIGS. 7a and 7b illustrate a novel accessory support stand 42 for the various anchor plate assemblies shown herein which allows the user to support an object in a raised and spaced manner above the anchor baseplate. The accessory support stand 42 comprising a preferably metal, square or rectangular planar base 44 and an upstanding preferably metal square-shaped, tubular body member composed of four sidewalls 43 joined at one end to the planar base 44 by welding. A weep hole 45 is provided at the base of one sidewall 43 to allow water to drain therefrom. The base 44 has a central hole 49 (FIG. 7b) which is alignable with the internally threaded bore 17' of the cylindrical post 16" and the threaded stem of bolt 26 is threadably received within the internally-threaded bore 17' to anchor the support stand 42 to the anchor baseplate 11". At least one set of horizontally aligned holes 46 are formed in opposite side walls 43 of the upstanding tubular body through which a threaded bolt 47 could be mounted to secure an object to one of the sidewalls 43 of the support stand 42 as shown best in FIG. 7b. In this case, the U-shaped channel 24' is provided with a recessed through bore 25' in one of its sidewalls rather than in its base wall 23' as shown in the embodiments of FIGS. 1-6. The bolt 47 is held in the recessed throughbore 25' via its bolt head being held against the step of the channel through bore 25' and at its opposite end (i.e., the free end of its threaded shaft extending through the sidewall hole 46) by an additional nut 48 and washer 48 to secure the U-shaped channel 24' in a raised and elevated position relative to the anchor baseplate 11" and roof member 21' and offset relative to the center blind bore of the anchor baseplate 11".

Figure 8A:
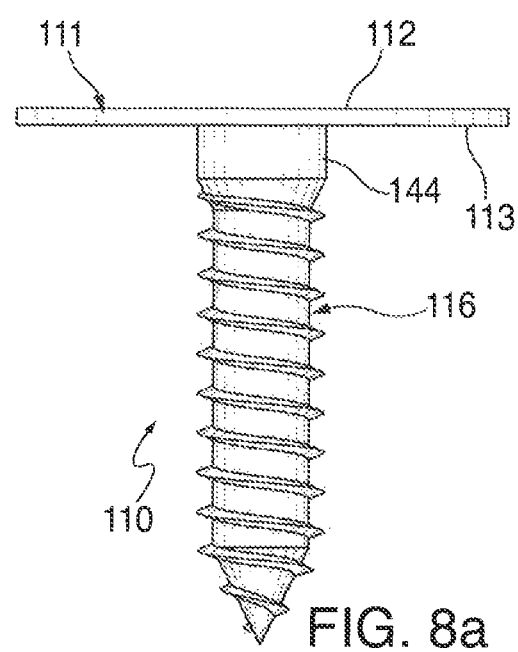
FIG. 8a is a side elevational view of a combined flush screw anchor and fastener assembly according to a fourth embodiment of the present invention.
Figure 8B:
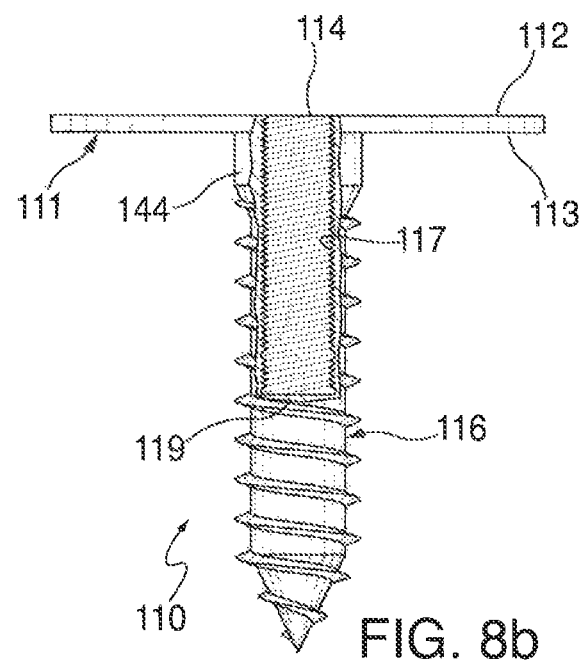
Figure 8C:
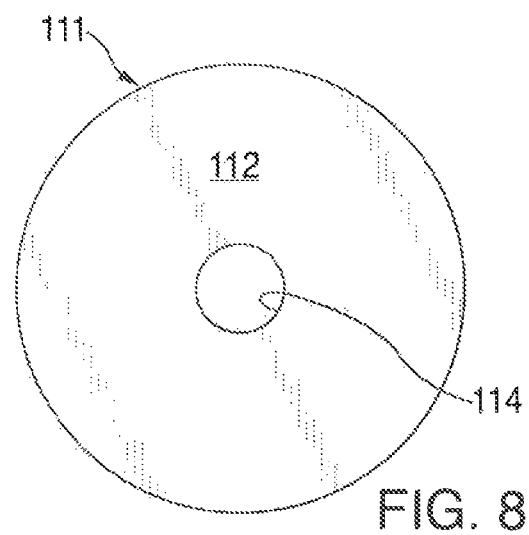
FIG. 8c is a top view of the flush screw anchor flange assembly shown in FIGS. 8a and 8b.

Turning now in particular, FIGS. 8*a*-8*j* illustrate several embodiments of the novel screw anchor and fastener assemblies (hereinafter generally referred to as "screw anchors" or "screw anchor assemblies") according to the present invention, as shown and described in Applicant's earlier filed continuation-in-part PCT Application No. PCT/US2019/018592. As shown in FIGS. 8*a*-8*c*, anchor assembly 110 is a flush screw anchor and is particularly useful in the building trade for a myriad of uses. Flush screw anchor assembly 110 comprises a preferably planar baseplate, flange or washer 111 having an upper surface 112, an opposite lower surface 113, and an optionally-internally-threaded central opening 114 extending therethrough. Additionally, screw anchor assembly 110 also includes an externally-threaded post, preferably in the form of a screw or a lag screw 116 secured to anchor baseplate 111 and extending downwardly from lower surface 113 of baseplate 111. As shown best in FIG. 8*b*, the upper shaft of screw 116 includes an axially-extending, internally-threaded central bore 117 which merges with and is axially aligned with central opening 114 of baseplate 111. Bore 117 has a diameter smaller than the external diameter of the externally-threaded upper shaft of screw 116.

Bore 117 in screw 116 is a blind bore having an open top end defined by the bore 114 in flange or baseplate 111 and a closed bottom end 119 in the shaft of screw 116. It is also preferred that screw 116 and baseplate 111 are integrally joined to form a one-piece combined anchor and fastener assembly or component. Screw 116 can be secured to baseplate 111 via welding, a press-fit connection or by any other fastening means that would insure that screw 116 and baseplate 111 are securely and rigidly fastened together to provide a strong and robust anchor.

As will be shown and discussed hereinafter in relationship to the installation and use of the screw anchors of the present invention for this embodiment and the other embodiments described herein, a fastener typically in the form of bolt 26 having an enlarged head and a threaded shaft together with a washer 27 as shown in FIGS. 4*a*, 4*c*, 5*a*, 5*b*, 6*a*, 6*b* and 7*a* is threadably receivable in the bore 117 to hold and securely fasten an object to the anchor so that the object, or part thereof or an associated accessory structure therefor (as to the latter, see, e.g., the U-shaped shoe 24 used to support a glass panel 22 for a roof railing), is securely held fast against the upper surface 112 of anchor baseplate 111. This is accomplished preferably by providing a throughbore 25 in the object, part or accessory structure therefor, through which the threaded shaft of the bolt 26 is passed through before it is threaded into the blind bore 117 of the screw anchor 110 and tightened to securely fasten the object to the screw anchor.

Figure 8D:
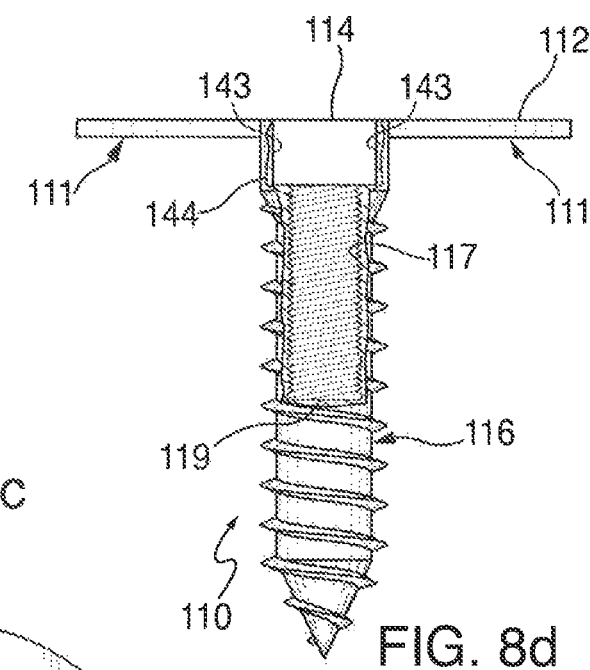
FIG. 8d is a side elevational view, in part section of a flush screw anchor assembly, similar to FIG. 8b, but showing the optional provision of a flat head screwdriver port.
Figure 8E:
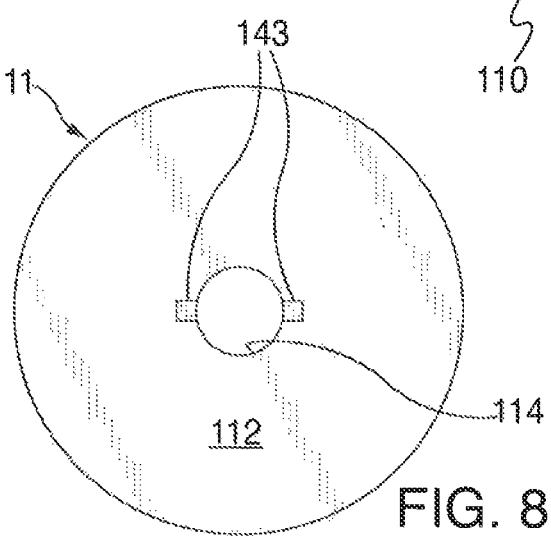
FIG. 8e is a top plan view of the flush screw anchor flange assembly shown in FIG. 8d.

FIGS. 8*d* and 8*e* illustrate a modification of the flush anchor embodiment shown in FIGS. 8*a*-8*c*, wherein a recessed, flat head screw slot or port 143 is formed in baseplate 111 on opposite sides of its central bore 114 which extends therebelow into the upper, externally smooth and enlarged head portion 144 of lag screw flush anchor 110 on opposite sides of its central bore 117 to allow a flat head screwdriver or other tool (not shown) to be inserted into said slot 143 to facilitate turning of the externally-threaded shaft of screw 116 to either screw the anchor 110 into the intended supporting structure or to threadably remove it therefrom, if e.g., it needs to be repositioned in the building supporting structure.

FIGS. 8*f* and 8*g* illustrate another modification of the screw anchor assembly shown in FIGS. 8*a*-8*c*, wherein instead of the employment of a flat head screwdriver port 143, an Allen key port 145 is provided. More particularly, a countersunk head space 146 is provided above the top end of the blind bore 117 in the anchor baseplate 111 and in the upper, externally smooth enlarged head portion 144 of lag screw anchor 110 extending downwardly from the top surface 112 of washer 111 into the countersunk head space 146 provided in, and jointly defined, by baseplate 111 and head portion 144.

The head space 146 has an inner wall configured to define a preferably hexagonal central bore 145 which serves as the Allen key port. The Allen key port 145 is designed to receive an Allen key (not shown) by which the flush screw anchor 110 can be easily and threadably screwed into, and removed from the support structure, as described and illustrated in greater detail hereinafter.

In a fifth embodiment of the screw anchor assembly of the present invention, as shown in FIGS. 8*h*-8*j*, a hex head lag screw anchor 210 is provided having a hexagonal hex nut 250 secured atop upper surface 212 of baseplate 211. The hexagonal hex nut 250 serves the same purpose as the screwdriver slot, Allen key port, or the like, whereby a tool such as a socket wrench (not shown) can be used which is configured to grip the hex head to facilitate its threaded engagement into, or removed from a support. External hex nut 250 is preferably integrally joined to baseplate 211, such as by welding, to form a one-piece component. As shown best in FIG. 8*i*, external hex nut 250 contains an internally-threaded, central through bore 252 which is in axial alignment and registering with central bore 217 of lag screw 216 and bore 214 of baseplate 211. While anchor 210 is illustrated and described as having a hexagonal shaped nut 250, other polygonal or geometric shapes are possible and contemplated by the present invention and as further disclosed below.

Turning now to FIGS. 9*a*, 9*b*, 10*a*, 10*b*, 11, and 12, these figures illustrate the use of the anchor platform assembly to mount a conventional lightning rod assembly 80 on a roof or other structure. A conventional lightning rod comprises a pointed metal rod typically attached to the roof of a building. The rod might be an inch in diameter. It connects to copper or aluminum wire or cable 90 that is also an inch or so in diameter. The cable 90 is usually connected to a conductive grid or plate buried in the ground nearby (not shown). In a lightning strike, the lightning rod 80 provides a low-resistance path via the cable 90 to the ground that can be used to conduct enormous electrical currents away from the structure and safely to the ground.

Figure 9A:
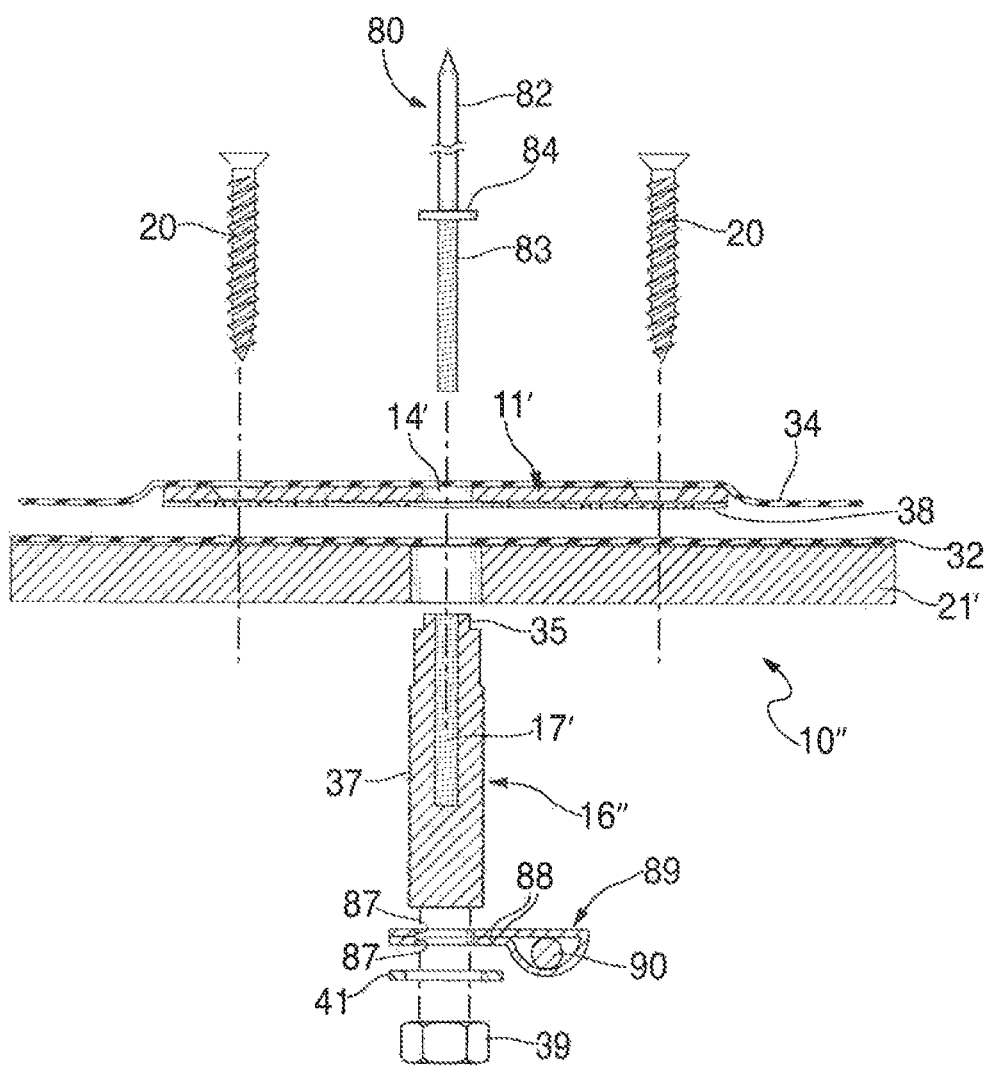
FIG. 9a is an exploded, cross-sectional view of the anchor platform assembly according to a sixth embodiment of the present invention comparable to FIG. 6a, but showing it supporting a lightning rod and cable, and further showing the use of roof flashing materials, fasteners and adhesives employed therewith.

More particularly, FIG. 9*a* is an exploded, cross-sectional view of a sixth embodiment of the anchor platform assembly 10" of the invention used for supporting and mounting a lightning rod generally designated 80, on a roof or other structure 21'. As shown, the baseplate assembly 11' is generally the same as depicted in the third embodiment shown in FIGS. 6*a* and 6*b*. The post 16" has a lower externally-threaded portion 37 physically attached (e.g., welded) to the lower surface of the baseplate 11'. The blind bore 17' in post 16" is also threaded. The lightning rod 80 preferably has a pointed, elongated, cylindrical upper body 82 joined via a fixed collar 84 to a lower, threaded cylindrical rod 83, which rod 83 is threadably receivable in blind bore 17' of post 16". Below the roof, a generally C-shaped, double-armed clamp 89 is employed to securely hold the grounding cable 90 and is provided with a mounting hole 87 in each of its arms 88 by which it is mounted on the threaded portion 37 of the post 16". A washer 41 and nut 39 are receivable on the lower threaded end 37 of post 16" and, as seen best in FIG. 9b, upon tightening of nut 39 on post 16", the washer 41 and nut 39 press against and securely fasten the C-shaped clamp 89 and the cable 90 held thereby to the underside of the roof 21'. The grounding cable 90 extends along the underside of the roof and ultimately is guided to the ground where it typically would be attached to a grounding grid or plate in the ground (not shown). In actual use, the grounding cable 90 will be attached to the lightning rod assembly with the aid of a variety of conventional grounding and clamping assemblies for attaching the grounding cable 90 to the lightning rod 80 and ground, which are well known by those skilled in the art. The C-shaped clamp described and illustrated herein is merely a simplified representation of these commercially available clamps.

As shown best in FIG. 9a, the cylindrical post 116 is provided with a narrow neck portion 35 and the baseplate 11' is provided with a non-threaded central bore 14' to realize a more robust stronger bond therebetween. The stronger bond is due to the fact that when said anchor plate 11' and post 16" are welded together, with the respective center bore 14' and internally-threaded bore 17' of post 16" being held in proper alignment by the reduced neck section 35, the narrow neck portion 35 extends into the non-threaded central bore 14', like a dowel which affords not only a strong, rigid joint, but also an exact 90° alignment of the baseplate 11' and post 16". Of course, it is also possible to use the anchor plate 11' and post 16" without the reduced neck section, as an option, depending on the nature and demands of the strength of the anchor assembly for the particular application, such as shown in FIGS. 1-4c.

Figure 9B:
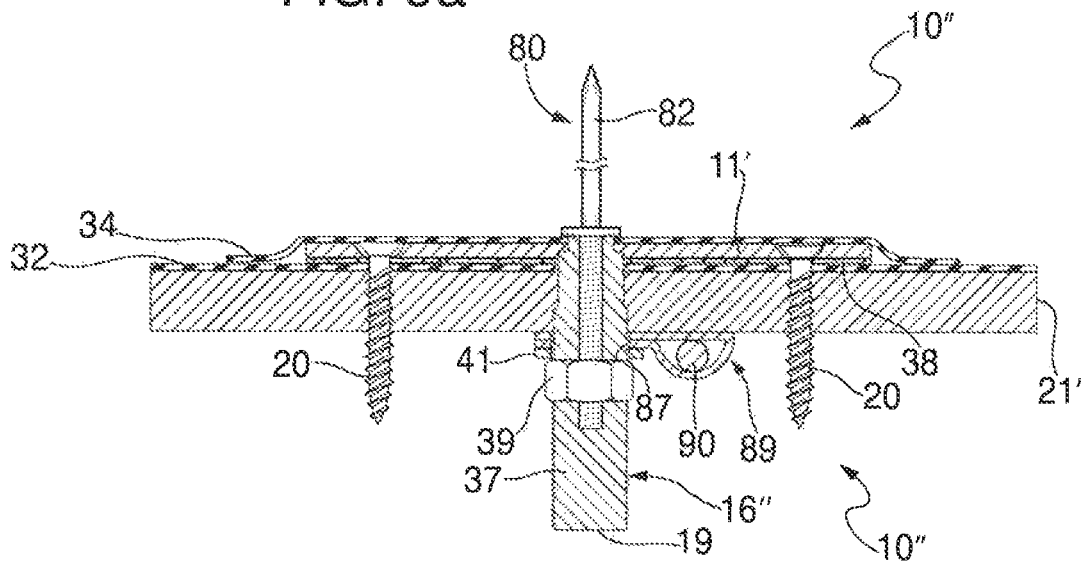
FIG. 9b is a cross-sectional view of the anchor platform assembly shown in FIG. 9a in a fully mounted state.
Figure 10A:
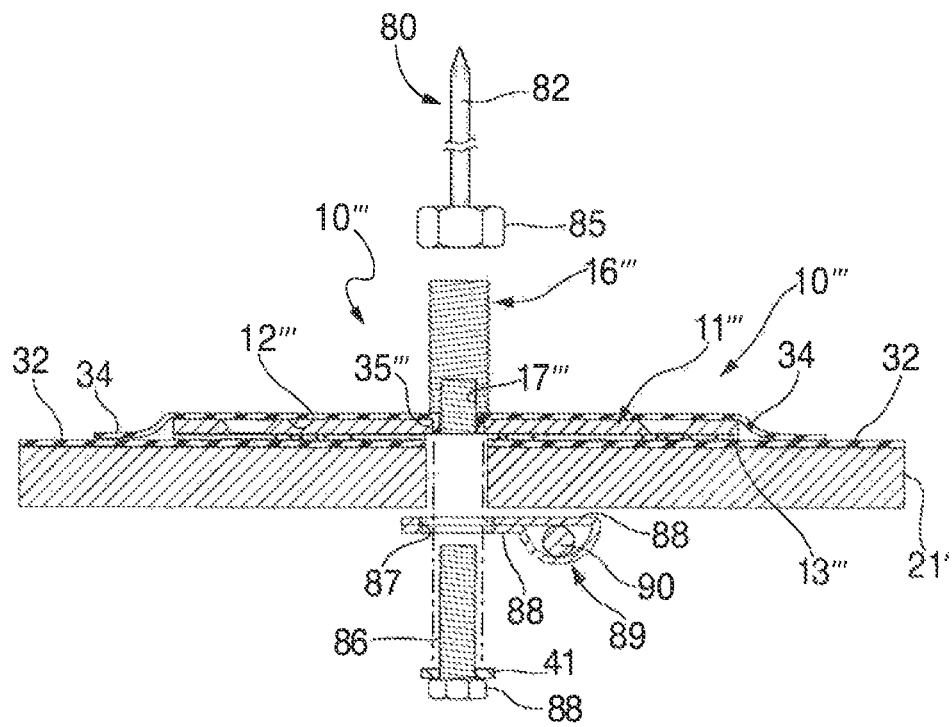
FIG. 10a is an exploded, cross-sectional view according to a seventh embodiment of the present invention for supporting a lightning rod, where the anchor baseplate is positioned in an upside-down state with the threaded post extending above instead of below the anchor baseplate as shown in FIGS. 9a and 9b, and further showing the roof flashing materials, fasteners and adhesives employed therewith.

FIG. 10a is an exploded, cross-sectional view of a seventh embodiment of the anchor platform assembly 10''' of the present invention. The anchor baseplate 11''' of the anchor platform assembly 10''' is in an upside-down version of the anchor baseplate 16" depicted in FIGS. 9a and 9b. The post 16''' has a centrally disposed, threaded blind bore 17''' and narrow neck portion 35''', the latter of which is physically attached (e.g., welded) to the upper surface 12''' of the baseplate 16''', instead of the bottom surface 13' thereof as shown in the earlier embodiments. In this embodiment, the grounding cable 90 is again held by a dual-legged, C-shaped clamp 89 via the openings 87 in its pair of arms 88 which is received on the externally-threaded shaft 86 of a bolt 26.

Figure 10B:
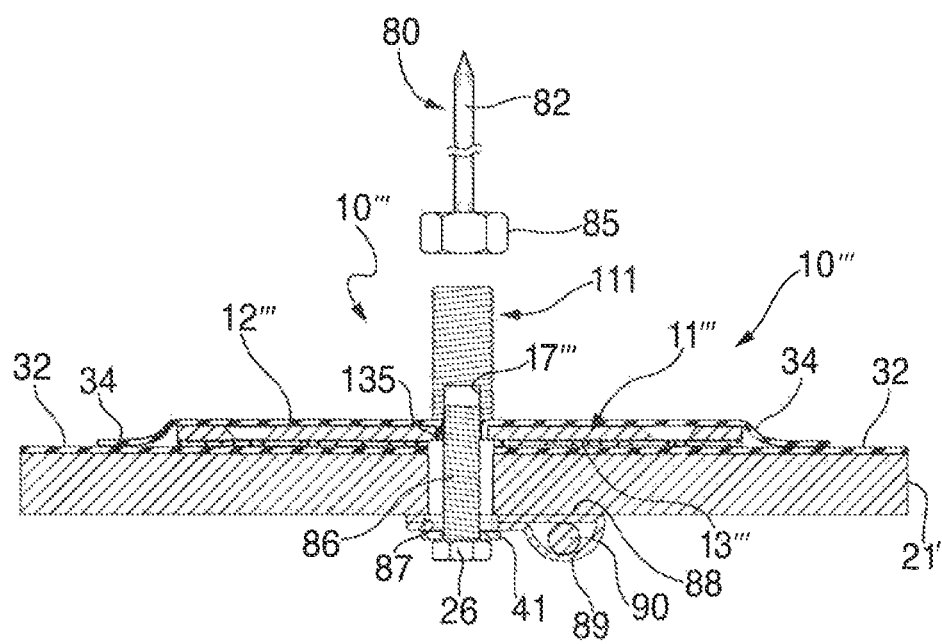
FIG. 10b is a cross-sectional view of the anchor platform assembly shown in FIG. 10a in a fully mounted state.

FIG. 10b is a cross-sectional view of the seventh embodiment of the anchor platform assembly 10''' in a fully mounted state but in an upside down manner comparable to that of FIG. 9b. The threaded shaft 86 of bolt 26 is inserted through an opening in the roof deck 21' from beneath the roof deck 21' and the openings in membranes 32 and 34 and threadably received in the internally-threaded blind bore 17''' of post 16'''. The enlarged head of bolt 26 and a washer 27 serve to rigidly secure the C-shaped clamp 89, and, in turn, grounding cable 90 to the bottom surface of the roof.

The pointed shaft 82 of lightning rod 80 is connected to a nut 85, by which the lightning rod 82 is threadably fastened above the roof 21'to the post 16''' of the anchor baseplate assembly 10'''. As a result, the lightning rod 80 is electrically coupled via nut 85 to post 16''', bolt 26 and clamp 89 to the grounding cable 90 and, in turn, to a conductive grid or plate in the ground (not shown).

Figure 11:
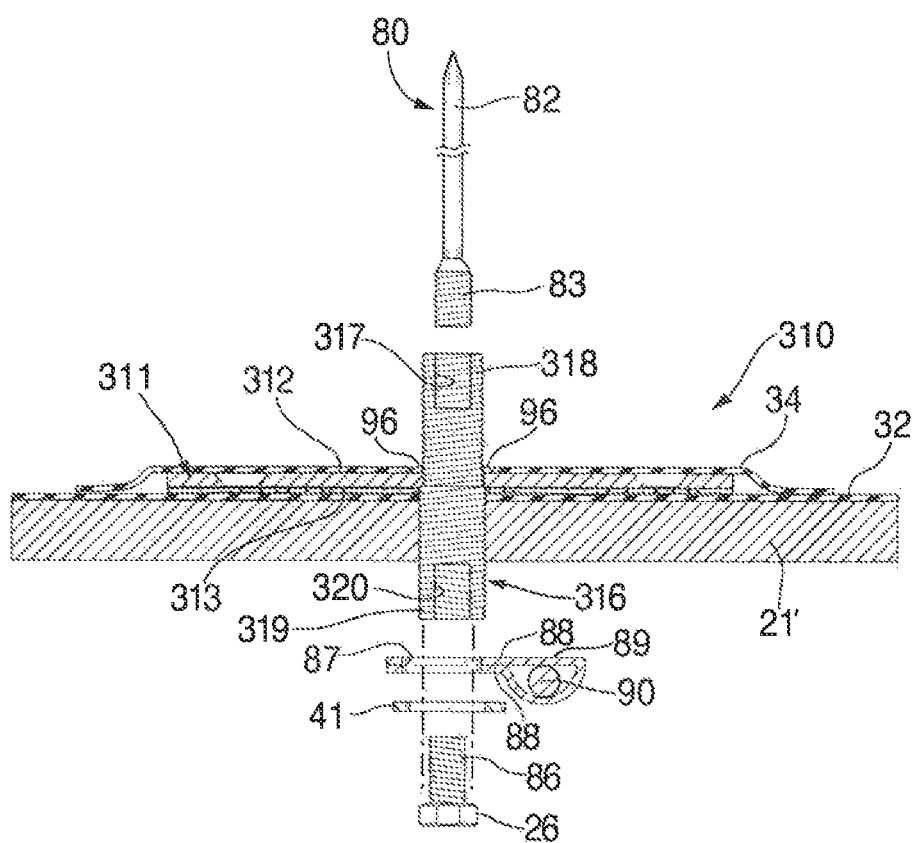
FIG. 11 is an exploded, cross-sectional view of an anchor platform assembly embodying an eighth embodiment of the present invention for supporting a lightning rod, wherein the anchor baseplate is welded to an internally-threaded, dual cylindrical post having an upper post extending above the baseplate having a threaded blind bore in which the lightning rod is threadably receivable and a lower post having a threaded blind bore to which a grounding cable is clamped.

FIG. 11 is an exploded, cross-sectional view of an eighth embodiment of the anchor platform assembly 310 of the present invention also having a dual post 316 comprised of an upper post 318 joined to the top surface of the baseplate by welds 96 above the anchor baseplate 311 and having an internally-threaded blind bore 317 opening onto the free upper end of post 318. The dual post 316 also has a lower post 319 extending from the bottom wall 313 and projecting downwardly below the roof 21. It too has an internally-threaded blind bore 320 opening onto its lower free end. A lightning rod 80 has an upper pointed section 82 and an externally-threaded lower section 83 which is threadably received in the threaded blind bore 317 of the upper post 318. On the other hand, the C-shaped clamp 89 is receivable on the lower threaded post 319 so that it can be held beneath the roof 21' abutting its lower surface when so mounted via washer 41 and nut 26 whose threaded shaft 86 is receivable in threaded internal bore 320 of lower post 319.

Figure 12:
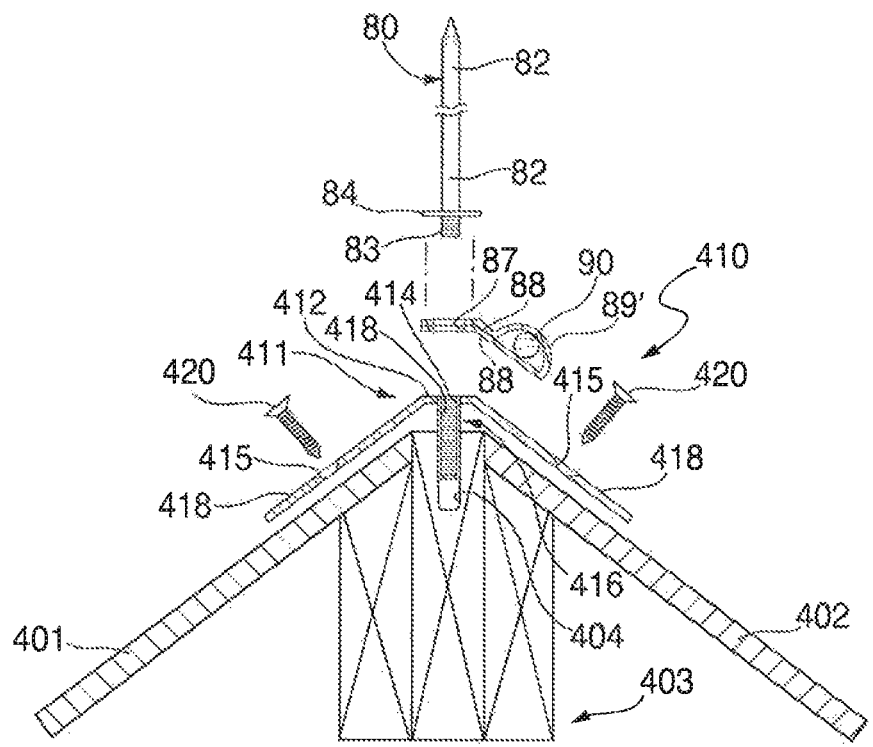
FIG. 12 is an exploded, cross-sectional view of an anchor platform assembly embodying a ninth embodiment of the present invention for supporting a lightning rod and clamped grounding cable mounted above and along the peak of a pitched roof.

FIG. 12 illustrates a ninth embodiment of the invention for applications where the lightning rod needs to be mounted on a pitched roof ridge composed of butted and joined roof sheathing 401, 402 supported by a three-ply roof ridge plate 403. The metallic anchor assembly 410 is provided with a bent baseplate 411 having a central horizontally-disposed central planar section 412 in which central bore 414 is formed and from which depends a cylindrical post 416 which is received within a bore 404 of the roof ridge plate 403. The base plate 411 has two bent wing sections 418 extending from opposite sides of the central planar section 412 which are angled to lie flat against the roof sheathing 401, 402.

As before, baseplate 411 would be attached to the roof sheathing 401, 402 via fastening screws 420 received through holes 415 in the bent wing sections 417. Flashing and adhesive materials (not shown) as used in the other embodiments would be used in a like manner as before as well.

The cylindrical post 416 can optionally be smooth or externally threaded as also shown in the earlier embodiments and it further has an internally-threaded central bore 417 in which the threaded lower section of 83 of a lightning rod 80 is threadably receivable so that its upper pointed section 82 projects upwardly preferably from the highest point on the roof. In applications like this, the grounding cable 90 usually runs along the roof ridge to connect to a plurality of spaced-apart lightning rods 82 (not shown) also via clamps 89 or the like.

Figure 13:
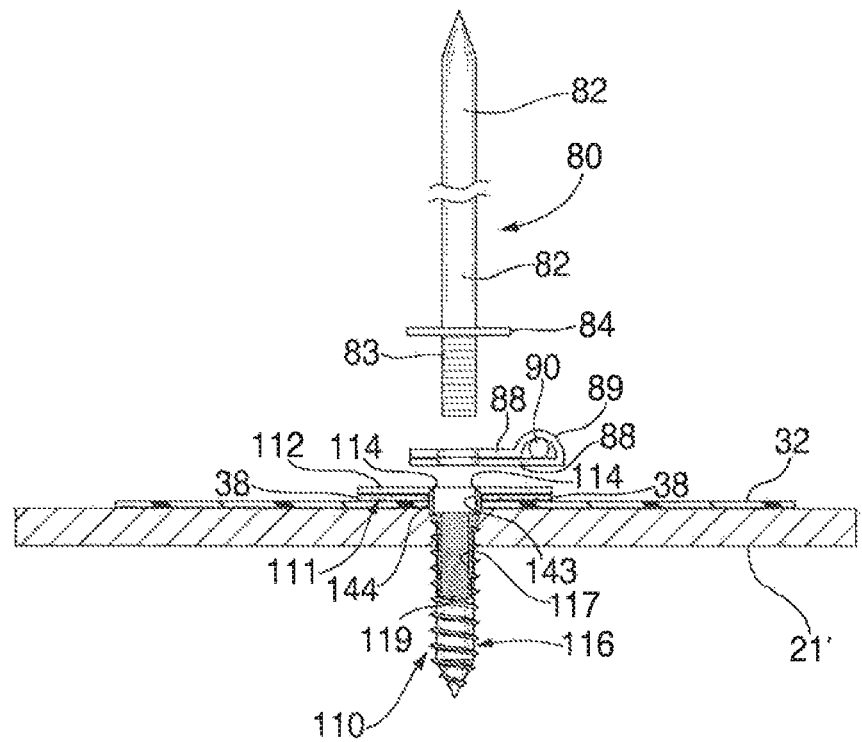
FIG. 13 is an exploded, cross-sectional view of a flush screw anchor assembly embodying a tenth embodiment of the present invention of the type shown in FIGS. 8a-8c, supporting a lightning rod and grounding cable on top of a roof.

FIG. 13 illustrates a tenth embodiment of the inventive anchor assembly for securing a lightning rod 80 to roof sheathing 21' covered by a membrane 32. This embodiment employs a small screw anchor of any of the types shown in FIGS. 8a-8e. In this example, a flush screw anchor 110 of the type shown in FIG. 8d is used which has a baseplate or washer 111 having an upper surface 112, an opposite lower surface 113, and a central opening 114 extending therethrough.

As further shown in FIG. 13, the lower surface 113 of baseplate 111 is adhered to a roof membrane 27 via a sealant 38 such as caulk, and the roof membrane 27 is likewise adhesively attached to the typically plywood roof sheathing 21'. The threaded lower end 83 of the lightning rod 80 is inserted therethrough and threadably received in threaded blind bore 117 so that the C-shaped clamp 89 holding cable 90 is tightly clasped between collar 84 and the upper surface 112 of baseplate 111.

Figure 14:
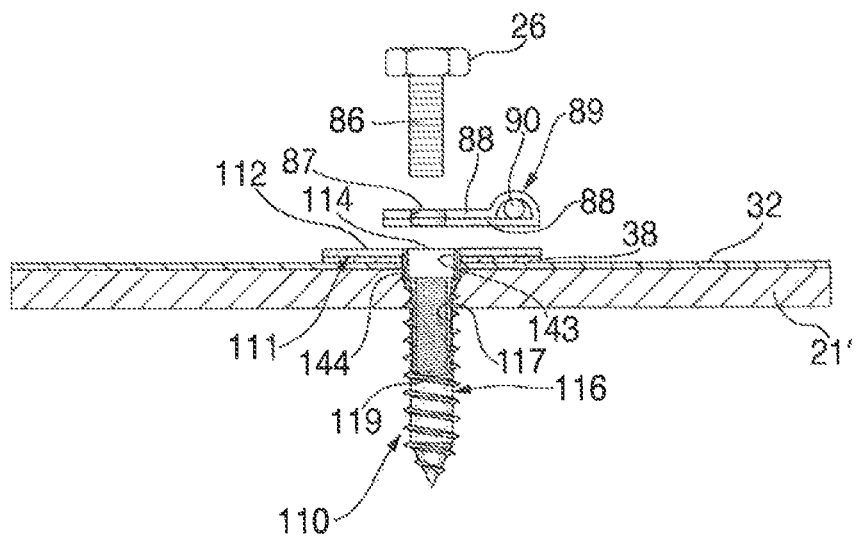
FIG. 14 is an exploded, cross-sectional view similar to FIG. 13, but showing instead the small flush anchor being used to support a length of grounding cable supported by a clamp affixed above and along the roof via a threaded bolt receivable in the anchor's threaded blind bore.

FIG. 14 illustrates the small flush anchor 110 mounted on a roof 21' but instead is being used to support a length of grounding cable 90 along the roof 21' via grounding cable clip 89. The anchor 110 clamps the C-shaped 89 cable via a threaded bolt 26 which is receivable through openings 87 in clip arms 88 and is threadably receivable in threaded bore 117 to clamp the clip 89 between the bolt head 26 and the upper surface 112 of baseplate 111 of anchor 110 when the bolt 26 is fully received in threaded bore 117 of anchor 116. As can be appreciated, multiple spaced-apart small flush anchors 110 may utilize multiple cable clips 89 to affix a length of cable 90 on and along a roof or wall or other structure.

Figure 15:
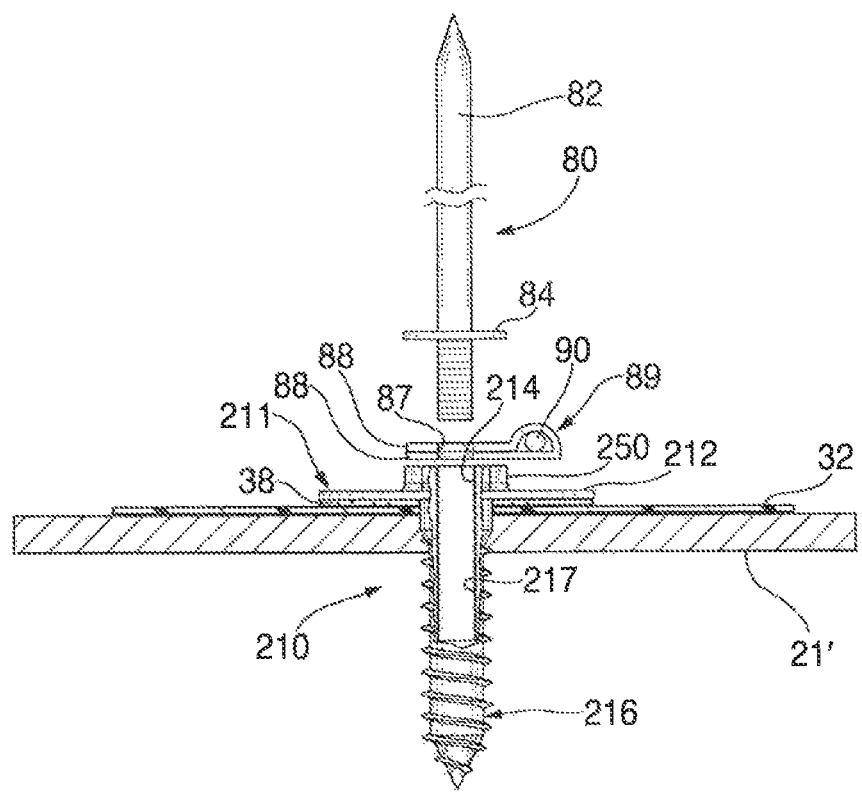
FIG. 15 is an exploded, cross-sectional view of a raised hex head screw anchor assembly of the type shown in FIGS. 8h-8j embodying an eleventh embodiment of the present invention shown supporting a lightning rod on top of a roof.

FIG. 15 illustrates an eleventh embodiment of the present inventive anchor assembly, utilizing the hex nut screw anchor assembly 210 of FIGS. 8h-8j An external hex nut 250 is formed on top surface 212 of baseplate 211. External hex nut 250 is preferably integrally formed with baseplate 211 as a one-piece component. However, hex nut 250 can be welded or otherwise affixed to baseplate 211. External hex nut 250 contains an internally-threaded central through bore 252 which is in axial alignment with central bore 217 of shaft 216 and opening 214 of baseplate 211, as seen best in FIG. 8i. While small raised anchor 210 is illustrated and described as having a hexagonal shaped nut 250, other shapes are possible and contemplated by the present invention.

Axially aligned bores 87, 214, and 217 are configured and dimensioned to progressively receive the threaded lower end 83 of the lightning rod 80 to secure the lightning rod 80 to anchor 210 and, therefore, to roof 21' covered by membrane 27. An adhesive layer 38 is also preferably provided on the underside surface 213 of baseplate 210. The lightning rod 80 is also provided with a fixed collar 84 which serves to press against and secure the C-shaped clamp 89 holding the grounding cable 90 against the top of hex head 250 when fully mounted.

Figure 16:
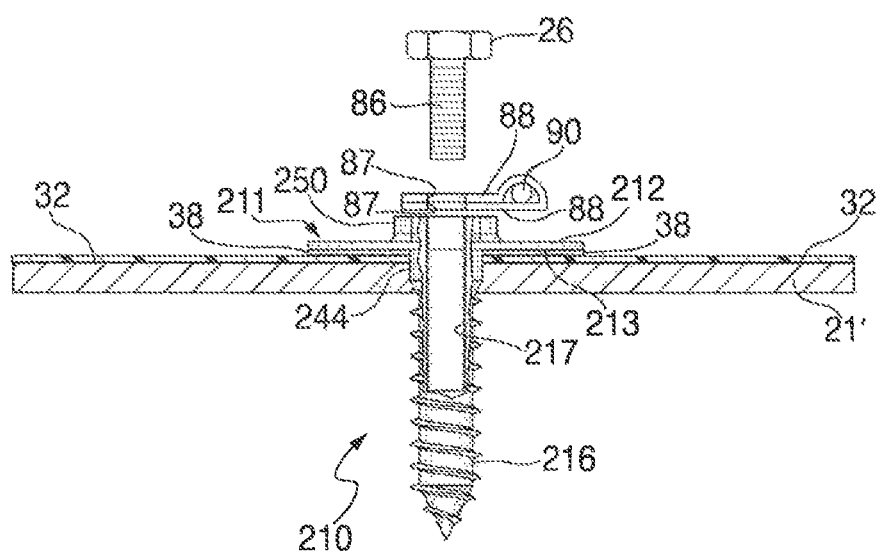
FIG. 16 is an exploded, cross-sectional view similar to FIG. 15, but showing instead the raised hex head screw anchor shown in FIGS. 8h-8j being used to support a length of grounding cable supported by a clamp along the top of the roof via a threaded bolt receivable in the anchor's threaded blind bore.

FIG. 16 illustrates the small raised anchor 210 mounted on a roof 21', but instead is being used to support a length of grounding cable 90 along the roof via a grounding cable C-shaped clamp 89. The anchor 210 clamps the cable 90 via threaded bolt 26, whose threaded shaft 86 is receivable through aligned bores 87, 214 and 217 to clamp the clip 89 between the head of bolt 26 and the upper surface of baseplate 211 when full received in threaded bore 217 of anchor 210. Here too, multiple spaced-apart small raised anchors 110 can be used to affix a length of grounding cable 90 via multiple cable clips 89 on and along a roof, wall or other structure leading to the ground.

Turning now to FIGS. 17a-c to FIGS. 20a-c, therein illustrated are several more examples of various types of dual post anchors embodying the present invention (see also FIG. 24). In FIGS. 17a-c, the anchor assembly 510 has a dual post 516 composed of an externally threaded, cylindrical upper post 518 and an externally threaded, cylindrical lower post 519 each of which is securely fastened to the base plate 511 via its central throughbore (not shown) but as shown in the previous embodiments.

In addition, the bottom surface 513 of the circular disk-shaped baseplate 516 is optionally provided with a circular channel or groove 521 for receipt of an adhesive or caulk (not shown) which would normally be applied between the bottom surface 513 of the baseplate 511 and the supporting roof or membrane on which the anchor 510 was supported. In this embodiment, the upper post 518 has a larger diameter than the lower post 519.

The other embodiments of FIGS. 18-20 have many of the same elements as shown in FIGS. 18a-18c and the elements in each of these four embodiments are provided with the same reference numerals where applicable except that they are preceded by the numbers 5, 6, 7, 8, respectively, to distinguish between the four embodiments illustrated. They also have the same general structure and arrangement as set forth and described above in relation to FIGS. 17a-c and therefore only the differences between these different dual post anchors will be described below.

Figure 20A:
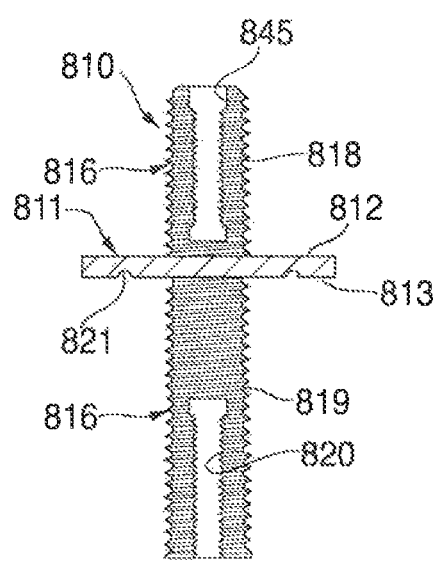
FIG. 20a is a side elevational view of a dual post anchor baseplate assembly according to a fifteenth embodiment of the present invention having an externally-threaded, cylindrical upper post with a blind bore and an externally-threaded, cylindrical lower post with a blind bore, both of which have the same diameter.
Figure 20B:
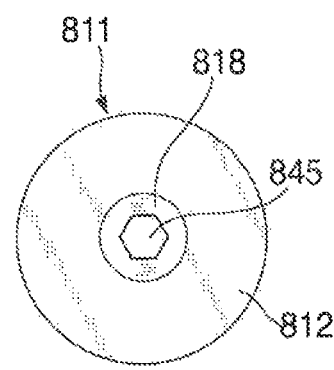
Figure 20C:
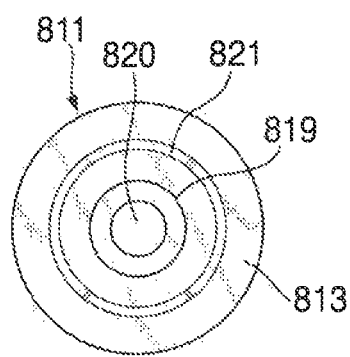

More particularly, FIGS. 18a-18c illustrates a variation of the dual post anchor shown in FIGS. 17a-c but with the added feature of an Allen key port 645 provided in the blind bore 618 of upper port 618 to facilitate turning of the anchor when inserted or removed. FIGS. 19a-19c illustrates a further version of the dual post anchor shown in FIGS. 18a-18c in that the upper post 718 is further provided with a centrally-disposed, axially-extending blind bore 717 beneath the Allen key port 745. FIGS. 20a-20c illustrates another adaptation of the dual post anchor shown in FIGS. 19a-19c wherein the bottom post 819 is also provided with a centrally-disposed, axially-extending blind bore 820 opening onto its lower end. In addition, in this embodiment the cylindrical upper and lower posts 817, 819, respectively, have the same diameter. It should also be noted that the dual posts embodiments of FIGS. 17a-c through 20a-c, could have smooth posts for situations where it is not possible to bolt the lower post from below the roof.

Figure 21A:
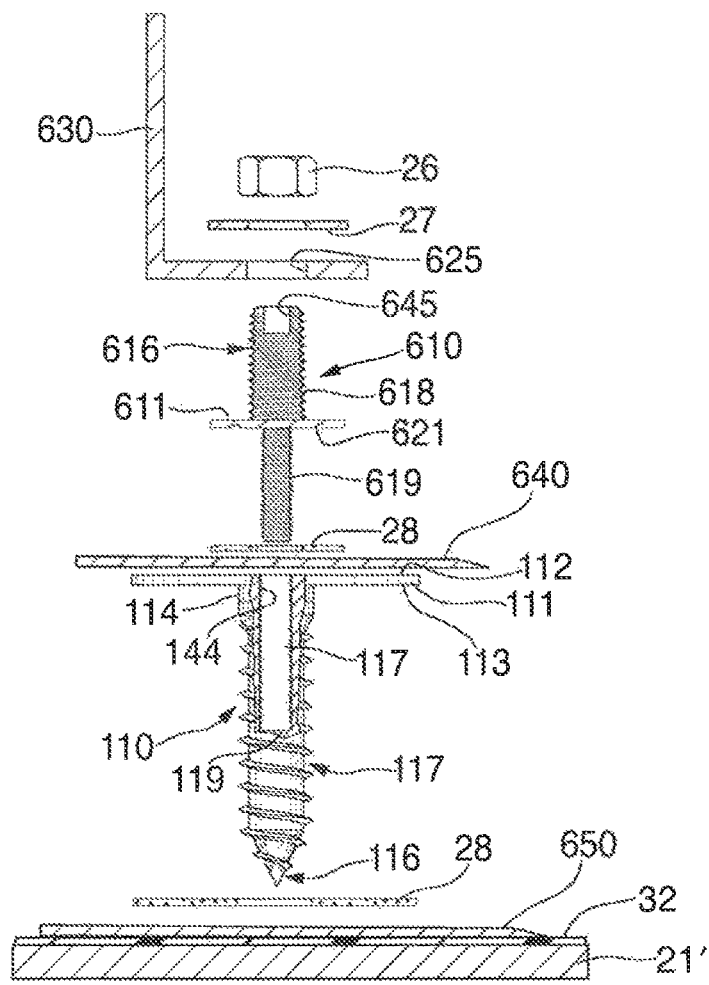
FIG. 21a is an exploded, side elevational view, in part section, of an anchor baseplate assembly utilizing both the dual post anchor baseplate assembly of FIG. 19a and the flush mount screw anchor of FIG. 8d for supporting an L-shaped solar panel bracket on a roof.
Figure 21B:
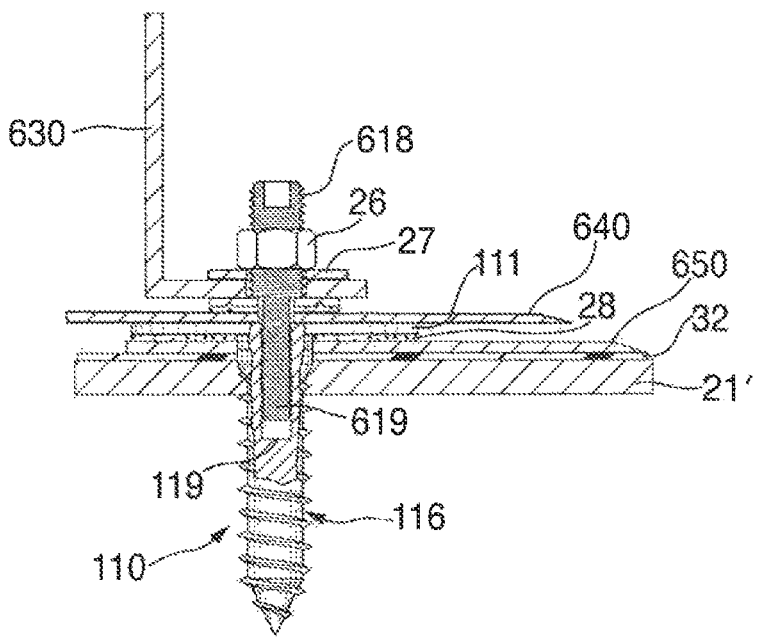
FIG. 21b is a side elevational view of the anchor baseplate assembly shown in FIG. 21a in a fully mounted state.

Turning now to FIGS. 21a and 21b, therein illustrated is an example of how the flush anchor of FIG. 8d and the dual post anchor assembly of FIG. 19a are used in combination to mount an L-shaped solar bracket 630 on a shingled roof having top shingles 640 and bottom shingles 650 mounted on a roof base 21' covered by a rubber membrane 32. As seen best in the exploded view of FIG. 21a, the dual post anchor flange 610 is disposed above of the top shingles 640 and the flush screw anchor 110 is disposed below the top shingles 640. A caulk ring 28 is, in turn, disposed between the lower surface 613 of anchor baseplate 611 and the upper surface 112 of flush anchor 110 so as to better adhere the lower surface of anchor baseplate 611 to top shingles 640 when its lower post 619 is threaded and inserted into the threaded blind bore 117 of flush anchor 110 as seen best in FIG. 21b. The flush screw anchor 110 is, in turn, threaded into the roof membrane 32 and roof base 21', and upon full threaded insertion, its lower anchor baseplate surface 612 will abut the upper surface of the bottom shingles 650 with a caulk ring 28 interposed therebetween. As previously mentioned, the caulk groove 621 on the underside 613 of anchor baseplate 611 serves to better retain the caulk within its groove 621 to ensure a better and waterproof bond to the bottom shingle 650.

As also shown in FIG. 21b, the L-shaped solar bracket support 630 has a throughbore 625 extending through its lower leg which allows the bracket 630 to be received over the upper cylindrical threaded post 618 of dual post anchor baseplate 610. It is, in turn, positioned to abut the upper surface 611 of anchor baseplate 610 and it is held thereagainst by means of nut 26 and washer 27 positioned on the upper side of the lower leg of L-shaped bracket 630. This embodiment is especially advantageous since the flush screw anchor 110 is mounted in the roof such that its baseplate 611 is in effect locked between the top and bottom shingles 640, 650 and this provides an especially strong and rigid anchor for supporting the L-shaped solar bracket 630 which can be easily fastened thereto by means of the dual post anchor assembly 610 with its lower post 619 received within the internally threaded bore 117 of flush anchor 110 and with the washer 27 and nut 26 received on the upper post 618 above the L-shaped support 630 to securely fasten the same to the flush anchor 110.

This embodiment is especially helpful for preventing damage to the upper roof tiles 640, especially where they could be made of fragile ceramic or clay tiles. More particularly, the upper roof tile 640 is sandwiched between the upper face 112 of anchor baseplate 111 and the lower surface 613 of anchor baseplate 610 of dual post anchor assembly 610 by threading the lower post 619 into the threaded blind bore of screw anchor 110 until it abuts the upper roof tile 640 in a snug manner, but without sufficient or undue force that might crack or damage the clay tile. Subsequently, when the solar panel or other heavy accessory is affixed to the L-shaped bracket 630, the load is directly transmitted to the post 619 in screw anchor blind bore 117 and the stable and fixed position of the anchor baseplate 611 above the roof tile 640 serves as a shield or barrier to prevent any crushing or damage thereto. In effect, the stable position of the anchor baseplate 611 and screw anchor baseplate 111 when so threadably joined together at a fixed spacing apart with the roof tile 640 sandwiched therebetween, isolates the roof tile held therebetween from any load placed on the L-shaped bracket 630, dual post anchor 610 and the flush screw anchor 110.

FIGS. 22*a* and 22*b* show an exploded and fully mounted view of an example of how the dual post anchor assembly 810 could be used to also mount a lightning rod 80 having a threaded lower section 83 and collar 84. In FIG. 22*a* the dual post anchor assembly 810 is positioned above a caulk ring 38 which, in return is disposed above the roof membrane 32 and roof 21'. The C-shaped clamping member 89 and the cable 90 are positioned below the roof 21' with a washer 41 and nut 39 therebelow. The lower post 819 of the dual post anchor 810 would be inserted through the caulk ring 38 and the throughbores in the roof membrane 32 and roof 21'. The C-shaped clamp 89 via its throughbores 87 in its legs 88 would be positioned onto the lower end of the post 819 and the washer 41 and nut 39 would be threaded onto the lower post 819 and tightened as needed. The Allen key port 845 could also be used to tighten or loosen the threaded engagement of its lower post 819 with washer 41 and nut 39.

As seen best in FIG. 22*b*, the threaded lower end 83 of lightning rod 80 would then be threaded into the threaded blind bore 819 of the upper post 818 to thereby mount the lightning rod 80 above the roof 21' and connect it electrically to the clamped grounding cable 90. On the other hand, if it were desired to space the grounding cable 90 from the bottom of the roof 21', a threaded extension rod (not shown) could be threaded into the threaded blind bore 820 of lower post 819 on which a pair of nuts and washers could be mounted to sandwich therebetween the clamping cable 89 and, in turn the grounding cable 90, spaced from the roof 21'. The externally-threaded lower post 819 and its threaded extension rod or internally-threaded bore 820 could also be used to secure or hold other accessory items.

Figure 23:
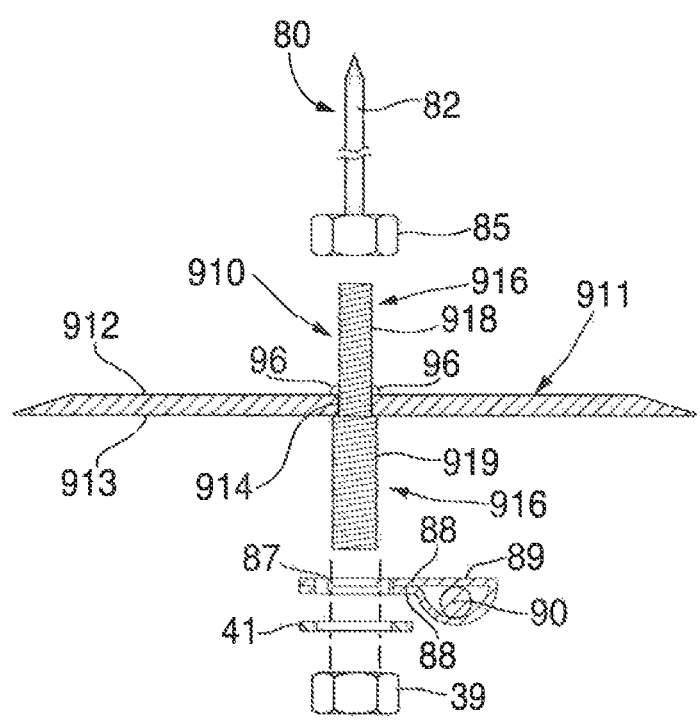
FIG. 23 is an exploded, cross-sectional view of an anchor platform assembly employing a sixteenth embodiment of the present invention for supporting a lightning rod and grounding cable, wherein the anchor baseplate is welded to an externally-threaded, dual cylindrical post having an upper post extending above the baseplate on which the lightning rod is threadably receivable and a lower post extending below the baseplate to which a grounding cable is clamped.

FIG. 23 is an exploded, cross-sectional view of a sixteenth embodiment of the anchor platform assembly 910 of the present invention. Therein, the anchor baseplate 911 is preferably welded via welds 96 to a dual cylindrical post 916 which has an externally-threaded, cylindrical upper post 918 disposed generally above the baseplate 911 but having a lower end which extends through hole 914 in baseplate 916 so that its lower end lies flush with the bottom surface 913 of baseplate 911. Dual post 916 also has an externally-threaded, cylindrical lower post 919 having an upper end affixed to the lower end of the upper post 918 and a lower end intended to extend below the anchor plate 911 and roof 21' (not shown). As shown, the dual posts 918, 919 are preferably prefabricated as one piece and preferably comprise posts of different diameters. This is typically accomplished by starting with a metallic cylindrical rod having a diameter of the largest intended diameter of the dual posts, in this case post 919, and turning an upper portion of the rod of the same intended length of post 918 on a lathe or the like, to reduce the diameter of the upper portion so that it matches the intended diameter of the lower post 919. As a result, the smaller diameter section or post 918 forms a neck where it merges with the top end of the larger diameter post 919 which abuts the bottom surface of anchor baseplate 913 at the bottom of throughbore 914.

As exemplified in FIG. 23, as a result the cylindrical lower post 219 has a larger diameter than the upper post 218. The dual post 216 is joined to the anchor baseplate 211 via its through hole 214 in the same manner as the externally-threaded posts with a reduced neck section 35, 135 in several of the earlier embodiments, such as FIG. 7*b*. More particularly, the one-piece dual post 916 comprises of upper post 918 and lower post 919 create at their point of connection a reduced or narrow neck section having a diameter slightly smaller than throughbore 914 in baseplate 911 while the lower post 219 has a larger diameter so that its top end serves as a "shoulder" to the "neck portion" that butts up against the bottom surface 913 of baseplate 911. Thus, here too, this configuration creates a strong, rigid joint and an easily replicated and exact 90° alignment of the baseplate 911 and dual post 916.

As further shown in FIG. 23, a lightning rod 80 having a pointed shaft 82 is attached to a lower, internally-threaded nut 85 which, in turn, is threadably secured on the externally-threaded upper post 918. Here too, a clamp 89 is used to clamp a grounding cable 90 and is receivable on threaded lower post 919 and held thereon by nut 39 and washer 41 against the lower surface of the roof 21' (not shown). When fully mounted on a support structure, such as a roof 21' as shown in FIGS. 10*a* and 10*b*, it too, would be installed with flashing materials, fasteners and/or adhesives as previously described herein.

While the foregoing specifically describes and illustrates the use of the anchor baseplate and screw anchor assemblies shown in use with, glass rails, lightning rods, grounding cables and L-shaped brackets for solar panels, they can also be used for anchoring and supporting a wide variety of other objects to support structures, such as roof or other building accessories, e.g., antennas, TV satellite dishes, HVAC units and the like.

As briefly touched upon in the discussion of FIG. 4*a*, it is important to use cylindrical mechanical fasteners having a "straight" thread for mounting an object on a support structure via the internally-threaded cylindrical blind bore of the various embodiments described herein. More specifically, mechanical fasteners of this type have a so-called "straight" thread—namely bolts with heads and cylindrical threaded shafts and cylindrical rod-shaped studs which are headless. This is to be distinguished from a "cone-shaped" screw which has a so-called "tapered" thread. The use of such a cylindrical bolt or stud fastener with a straight thread ensures a strong joint and the versatility of accommodating fasteners of varying lengths and widths for achieving various degrees of holding power via threaded receipt in the internally-threaded, cylindrical blind bores of the posts which also have a straight edge. In contrast, the mechanical fasteners used to affix the anchor baseplate to a support via ancillary holes 15 may generally be of any type including screws with a "tapered" thread.

As can also be appreciated from the foregoing, the shape and the number of anchor baseplates, the shape, type and number of posts, whether externally-threaded or smooth, the use of non-threaded throughbores, threaded blind bores, and the placement thereof can also be modified depending upon the specific details of the particular application such as the nature, size and material of the roof or other building support structures, such as metal, wood or some other composite. For example, a preferred range of the length or height of the posts may be anywhere from 0 inches (flush) to 18 inches. Similarly, it is anticipated that the types of fasteners, membranes flashing materials and sealants will also be chosen to be compatible with the roof or building structure. Also, the elements of the various embodiments may be substituted for one another where appropriate.

In addition, although the screw anchors aside from the raised hex head screw anchor, preferably employ a screw slot or an Allen key port to secure or remove the anchor to a support structure, with a flat head screwdriver or Allen key port. Other means, such as a star bit etc., could instead be used to assist the user in screwing in and/or removing the anchor to, or from, a building support.

It should also be noted that the dimensions of the various parts and elements can be varied as needed or preferred. For example, the upper and lower posts of cylindrical dual posts typically have diameters and are preferably in a range of ⅛" to 2". For example, one post could have a width of ½" while the other post could have a width of ¾", or they could have the same width. Of course, the diameter of the upper and lower sections can be larger or smaller relative to one another, as desired. The nut is preferably between ½" and 3", but a typical standard size may be ¾". The thickness of the baseplate may be varied according to need, for example, preferably between ¹⁄₁₆" to 1", but preferably ¼". Bolts with attached nuts, or bolts with separate nuts are usable and may be used interchangeably herein. In a preferred embodiment, the post has an external diameter of ½" and its internal bore has a diameter of ⅜". The screw anchor may have a width or thickness of about ¹⁄₁₆" and a diameter of about 1½". However, as mentioned above, the dimensions of the baseplate flange and bores can vary as well as the length of the posts and their internal bores.

The materials of the components of the anchor assemblies, such as the baseplates and posts can also be made of a variety of materials, including, e.g., metals such as stainless steel, aluminum, bronze, copper, plastic or composite materials. It is also preferred that the baseplate and its post and the screw anchors and their flanges are integrally formed as a one-piece component. However, it can be appreciated that the posts can be secured to the baseplate via welding or other means.

Accordingly, while particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. An anchor platform assembly for anchoring an object to a structure, comprising:
    an anchor baseplate having a generally planar first surface and second surface, an elongated, cylindrical post coupled to said anchor baseplate and projecting outwardly from said second surface thereof, wherein said post is at least partially externally-threaded and wherein said post has a first end secured to said anchor baseplate and a second free end, and an at least partially threaded, cylindrical blind bore extending from said first surface of said anchor baseplate into said post, with said second surface of said anchor baseplate being configured to allow the structure to lie generally flush against said second surface except for the area of said second surface covered by said post; and
    means for fastening an object to said anchor baseplate via said blind bore, comprising a cylindrical mechanical fastener having a straight thread.

2. The anchor platform assembly according to claim 1, additionally including means for fastening said anchor baseplate to a structure with said second surface thereof lying generally flush against the structure except for the area of said second surface covered by said post.

3. The anchor platform assembly according to claim 1, wherein said anchor baseplate is rectangular, said blind bore is generally centrally-disposed in said anchor baseplate, and wherein said anchor baseplate has a plurality of spaced-apart, ancillary through holes spaced from said blind bore.

4. The anchor platform assembly according to claim 3, including a plurality of mechanical fastening members, each receivable through one of said ancillary holes for fastening said anchor baseplate to the structure.

5. The anchor platform assembly according to claim 1, wherein said mechanical fastener comprises a bolt with an enlarged head and a threaded stem having said straight thread.

6. The anchor platform assembly according to claim 1, additionally including a nut receivable on said externally-threaded post for securing said anchor platform assembly to the structure from below said second surface thereof.

7. The anchor platform assembly according to claim 1, wherein said anchor baseplate is made from stainless steel.

8. The anchor platform assembly according to claim 5, wherein said anchor baseplate has a non-threaded throughbore in axial alignment and registry with said blind bore of said anchor baseplate and said post has a reduced diameter neck portion adjacent its first end which is configured and dimensioned for receipt within said non-threaded throughbore.

9. The anchor platform assembly according to claim 5, additionally including an object support member having a base wall and a bore formed therethrough which is positionable on said anchor baseplate so that said base wall bore is aligned with said at least partially threaded blind bore to permit said bolt threaded stem to be inserted through said basewall bore and into said at least partially threaded blind bore so as to fasten said object support member to said anchor baseplate.

10. The anchor platform assembly according to claim 5, additionally including an elongated and U-shaped object support member for an object which has a generally planar base wall and a pair of upstanding, spaced-apart sidewalls, each joined to an opposite end of said base wall thereof which, together with said basewall, defines a U-shaped channel with an open end in which an object may be inserted.

11. The anchor platform assembly according to claim 10, wherein said pair of upstanding, spaced-apart sidewalls of said object support member each have a throughbore extending therethrough; and:
    wherein said anchor platform assembly additionally comprises a support stand comprising a planar base and an upstanding tubular body member joined to said planar base, said planar base having a throughbore formed therethrough alignable with said threaded blind bore of said anchor baseplate to permit said bolt threaded stem to be inserted through said base throughbore into said threaded blind bore so as to fasten said planar base of said support stand to said anchor baseplate, and said tubular body member having a pair of opposing sidewalls, each having a throughbore aligned with the throughbore in the opposing sidewall thereto; and means for mechanically fastening said object support member to said support stand via at least one of said sidewall throughbores of said support stand and at least one of said sidewall throughbores of said object support member; and wherein said support stand is mechanically fastened to said anchor baseplate via said bolt threaded stem being inserted through said throughbore of said base wall thereof and threadably received in said threaded blind bore of said anchor baseplate.

12. The assembly according to claim 1, additionally including a lightning rod as said object, and said lightning rod has a lower end, and said means for fastening an object is provided on said lower end which is threadably received in said blind bore.

13. The assembly according to claim 12, additionally including an enlarged collar provided on said lighting rod above said lower end thereof and a nut threadably received on said externally-threaded post.

14. The assembly according to claim 5, additionally including a lightning rod as said object and said lightning rod has a lower end with a nut coupled thereto which is threadably receivable on said straight thread of said cylindrical mechanical fastener.

15. The assembly according to claim 12, wherein said anchor baseplate is bent to permit the same to be mounted on a pitched roof.

16. The assembly according to claim 15, wherein said anchor baseplate has a planar central portion through which said blind bore extends and a pair of downwardly extending wings joined to, and extending from, opposite sides of said planar central portion.

17. The assembly according to claim 1, additionally including a clamp for a grounding cable and wherein said clamp is threadably receivable on said externally-threaded post.

18. The assembly according to claim 1, wherein said post comprises an at least partially threaded screw.

19. The assembly according to claim 18, wherein said anchor baseplate comprises a flange.

20. The assembly according to claim 19, wherein said flange is a generally circular, planar flange.

21. The assembly according to claim 20, wherein a polygonally-shaped nut having a throughbore is affixed to the top surface of said baseplate with its throughbore in axial alignment and registry with said blind bore of said post of said anchor baseplate.

22. The anchor platform assembly according to claim 21, wherein said polygonally-shaped nut is a hexagonally shaped nut.

23. The assembly according to claim 18, wherein said screw has an upper tubular neck portion having a throughbore with an open top end and open bottom end, and wherein said bottom open end thereof merges with a threaded bore within a lower externally-threaded shaft portion which together define said at least partially threaded blind bore of said post.

24. The assembly according to claim 23, wherein said throughbore of said neck portion is at least partially threaded.

25. The assembly according to claim 23, wherein said blind bore has a longitudinally-extended axis and said assembly additionally includes means for rotating said anchor about said axis of said blind bore.

26. The assembly according to claim 25, wherein said means for rotating comprises a port formed adjacent and within said open top end of said tubular neck portion which is configured and dimensioned to accommodate a tool for rotating said anchor into a support structure.

27. The assembly according to claim 26, wherein said port is configured and dimensioned as a flat head screw slot.

28. The assembly according to claim 27, wherein said port is configured and dimensioned as an Allen key port.

29. The assembly according to claim 18, wherein said mechanical fastener comprises a bolt with an enlarged head and a threaded stem having said straight thread.

30. The assembly according to claim 18, additionally including means for fastening said anchor baseplate to the support structure with said bottom surface thereof lying generally flush against at least a portion of the support structure except for the area of said bottom surface covered by said post.

31. The assembly according to claim 18, additionally including a lightning rod as said object, and said lightning rod has a lower end, and said means for fastening an object is provided on said lower end which is threadably receivable in said blind bore.

32. The assembly according to claim 31, additionally including an enlarged collar provided in said lighting rod above said lower end thereof.

33. The assembly according to claim 32, additionally including a clamp for a grounding cable and said clamp is threadably receivable on said lower end of said lightning rod below said enlarged collar thereof.

34. The assembly according to claim 5, additionally including a clamp for a grounding cable serving as said object, and said clamp is receivable on said threaded stem of said bolt.

35. The assembly according to claim 34, wherein said anchor baseplate comprises a flange.

36. The assembly according to claim 35, wherein said flange is a generally circular, planar flange.

37. The assembly according to claim 36, wherein a polygonally-shaped nut having a throughbore is affixed to said first surface of said anchor baseplate with its throughbore in axial alignment and registry with said blind bore of said anchor baseplate.

38. The anchor platform assembly according to claim 34, wherein a polygonally-shaped nut having a throughbore is affixed to said first surface of said anchor baseplate with its throughbore in axial alignment and registry with said blind bore of said anchor baseplate.

39. The anchor platform assembly for anchoring an object to a structure according to claim 1, additionally comprising:

a second anchor baseplate having a generally planar first surface and second surface and a throughbore extending from said first surface to said second surface thereof, two additional, externally-threaded cylindrical posts, each have a first end secured to said second anchor baseplate with said first ends thereof secured to each other, and with at least one of said two additional posts extending into said throughbore in said second anchor baseplate so that said two additional posts are in axial alignment and registry with said second anchor baseplate throughbore and extend perpendicularly outwardly from said second anchor baseplate, said two additional posts each having a second free end and wherein said second surface of said second anchor baseplate is configured to allow said first surface of said anchor baseplate to lie generally flush against said second surface of said second anchor baseplate except for the area of said second surface of said second anchor baseplate covered by one of said two additional posts; and means for fastening an object to said second anchor baseplate via one of said two additional posts comprising a cylindrical mechanical fastener having a straight thread.

40. An anchor platform assembly according to claim 39, wherein said at least one of said two additional posts is externally-threaded.

41. An anchor platform assembly according to claim 39, wherein both of said posts are externally-threaded.

42. The assembly according to claim 40, wherein said at least one of said two additional posts comprises an at least partially threaded cylindrical stud having a straight edge.

43. The assembly according to claim 39, wherein said at least one of said two additional posts has an at least partially threaded cylindrical blind bore formed therein opening onto said free second end thereof.

44. The assembly according to claim 43, wherein said blind bore has a longitudinally-extended axis and said assembly additionally includes means for rotating said anchor about said axis of said blind bore.

45. The assembly according to claim 44, wherein said means for rotating comprises a port formed adjacent to and within said open top end of said blind bore.

46. The assembly according to claim 39, additionally including means for fastening an object to at least one of said two additional posts.

47. The assembly according to claim 46, additionally including an L-shaped support for a solar panel having a throughhole which is receivable on one of said two additional externally-threaded posts.

48. The assembly according to claim 40, additionally including a nut receivable on said one of said two additional externally-threaded posts to clamp said L-shaped support against said first surface of said second anchor baseplate.

49. The assembly according to claim 39, wherein both of said additional posts has an at least partially threaded cylindrical blind bore formed therein opening onto said free second ends thereof.

50. The assembly according to claim 39, wherein said two additional posts have different diameters.

51. The assembly according to claim 39, wherein said two additional posts have the same diameter.

52. An anchor platform assembly for anchoring an object to a structure, comprising:
an anchor baseplate having a generally planar first surface and second surface and a throughbore extending from said first surface to said second surface thereof, two cylindrical posts, each have a first end secured to said anchor baseplate with said first ends thereof secured to each other, and with at least one of said posts extending into said throughbore in said anchor baseplate so that said two posts are in axial alignment and registry with said anchor baseplate throughbore and extend perpendicularly outwardly from said anchor baseplate, said posts each having a second free end and wherein said second surface of said anchor baseplate is configured to allow the structure to lie generally flush against said second surface except for the area of said second surface covered by said post; and means for fastening an object to said anchor baseplate via at least one of said posts comprising a cylindrical mechanical fastener having a straight thread.

53. An anchor platform assembly according to claim 52, wherein said at least one of said posts is externally-threaded.

54. An anchor platform assembly according to claim 52, wherein both of said posts are externally-threaded.

55. The assembly according to claim 54, wherein at least one of said posts has an at least partially threaded cylindrical blind bore formed therein opening onto said free second end thereof.

56. The assembly according to claim 55, wherein said blind bore of said at least one of said two posts has a longitudinally-extended axis and said assembly additionally includes means for rotating said anchor about said axis of said blind bore.

57. The assembly according to claim 56, wherein said means for rotating comprises a port formed adjacent to and within said open top end of said blind bore of said at least one of said two posts.

58. The assembly according to claim 54, wherein both of said posts have an at least partially threaded cylindrical blind bore formed therein opening onto said free second ends thereof.

59. The assembly according to claim 58, wherein said two posts have different diameters.

60. The assembly according to claim 58, wherein said two posts have the same diameter.

61. The assembly according to claim 52, wherein said anchor baseplate has a channel formed on at least one side thereof for receipt therein of an adhesive.

62. The assembly according to claim 61, wherein said channel is circular and is spaced outwardly of said throughbore in said anchor baseplate.

63. The assembly according to claim 54, additionally including a lightning rod serving as an object and said lightning rod has a lower end, and said means for fastening an object is provided on said lower end which is threadably receivable on one of said two posts.

64. The assembly according to claim 54, additionally including a clamp for a grounding cable and a nut and said clamp and nut are threadably receivable on said free end of the other of said two externally-threaded posts so that said grounding cable lies flush against said second surface of said anchor baseplate.

* * * * *